(12) United States Patent
Lee et al.

(10) Patent No.: US 12,289,123 B2
(45) Date of Patent: Apr. 29, 2025

(54) ELECTRONIC DEVICE SUPPORTING COMMUNICATION BASED ON A PLURALITY OF FREQUENCY BANDS AND METHOD FOR OPERATING THE SAME

(71) Applicant: Samsung Electronics Co., Ltd., Suwon-si (KR)

(72) Inventors: Dongju Lee, Suwon-si (KR); Seunghyuk Kim, Suwon-si (KR); Suho Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 476 days.

(21) Appl. No.: 17/874,854

(22) Filed: Jul. 27, 2022

(65) Prior Publication Data

US 2023/0046247 A1 Feb. 16, 2023

Related U.S. Application Data

(63) Continuation of application No. PCT/KR2022/010733, filed on Jul. 21, 2022.

(30) Foreign Application Priority Data

Aug. 6, 2021 (KR) .................. 10-2021-0103664

(51) Int. Cl.
*H04B 1/04* (2006.01)
(52) U.S. Cl.
CPC ......... *H04B 1/0458* (2013.01); *H04B 1/0483* (2013.01); *H04B 2001/0416* (2013.01)
(58) Field of Classification Search
CPC .... H04B 1/109; H04B 17/318; H04B 1/1027; H04B 1/40; H04B 1/04; H04B 1/005;
(Continued)

(56) References Cited

U.S. PATENT DOCUMENTS 9,118,439 B2    8/2015    Fernando
9,350,580 B2    5/2016    Sidiropoulos et al.
(Continued)

FOREIGN PATENT DOCUMENTS

JP    2005-086665 A    3/2005
JP    2018-152720 A2    9/2018
(Continued)

OTHER PUBLICATIONS

International Search Report and Written Opinion dated Oct. 18, 2022, issued in International Patent Application No. PCT/KR2022/010733.

*Primary Examiner* — Khalid W Shaheed
(74) *Attorney, Agent, or Firm* — Jefferson IP Law, LLP

(57) ABSTRACT

An electronic device may comprise antenna, low-noise amplifier, radio frequency integrated circuit (RFIC), and communication. The communication processor may be configured to identify a low-noise amplifier for amplifying a first RF signal and a low-noise amplifier for amplifying a second RF signal, based on the low-noise amplifier for amplifying the first RF signal differing from the low-noise amplifier for amplifying the second RF signal, set a first gain of the low-noise amplifier for amplifying the first RF signal, set a second gain of the low-noise amplifier for amplifying the second RF signal, based on the low-noise amplifier for amplifying the first RF signal being identical to the low-noise amplifier for amplifying the second RF signal, set a third gain of a low-noise amplifier of amplifying the first RF signal and the second RF signal.

20 Claims, 22 Drawing Sheets

(58) Field of Classification Search
CPC ......... H04B 2001/0416; H03G 3/3052; H03G 3/30; H03F 3/195; H03F 3/68; H03F 1/26; H03F 2200/111
See application file for complete search history.

(56) References Cited

U.S. PATENT DOCUMENTS

| | | |
|---|---|---|
| 9,877,330 B2 | 1/2018 | Shapira |
| 10,340,860 B1 | 7/2019 | Wang et al. |
| 10,551,479 B1* | 2/2020 | Ylamurto ............... H04W 4/029 |
| 10,574,287 B1* | 2/2020 | Thoppay Egambaram ................. H03F 3/245 |
| 2005/0090287 A1 | 4/2005 | Rofougaran |
| 2008/0089397 A1 | 4/2008 | Vetter et al. |
| 2008/0280569 A1 | 11/2008 | Hazani et al. |
| 2017/0237484 A1 | 8/2017 | Heath et al. |
| 2018/0131502 A1 | 5/2018 | Askar et al. |
| 2018/0263075 A1 | 9/2018 | Nabetani et al. |
| 2018/0270765 A1 | 9/2018 | Wang |
| 2020/0244430 A1* | 7/2020 | Karabinis ................. H04L 5/04 |
| 2022/0200642 A1* | 6/2022 | Agrawal ............. H04B 1/0483 |
| 2023/0007601 A1 | 1/2023 | Venkatachari et al. |

FOREIGN PATENT DOCUMENTS

| | | |
|---|---|---|
| JP | 2018-526935 A | 9/2018 |
| KR | 10-2007-0011559 A | 1/2007 |
| KR | 10-2009-0085687 A | 8/2009 |
| KR | 10-0926260 B1 | 11/2009 |
| KR | 10-2010-0013152 A | 2/2010 |
| KR | 20-2012-0004138 U | 6/2012 |
| KR | 10-2018-0129768 A | 12/2018 |
| WO | 2018/063995 A1 | 4/2018 |

* cited by examiner

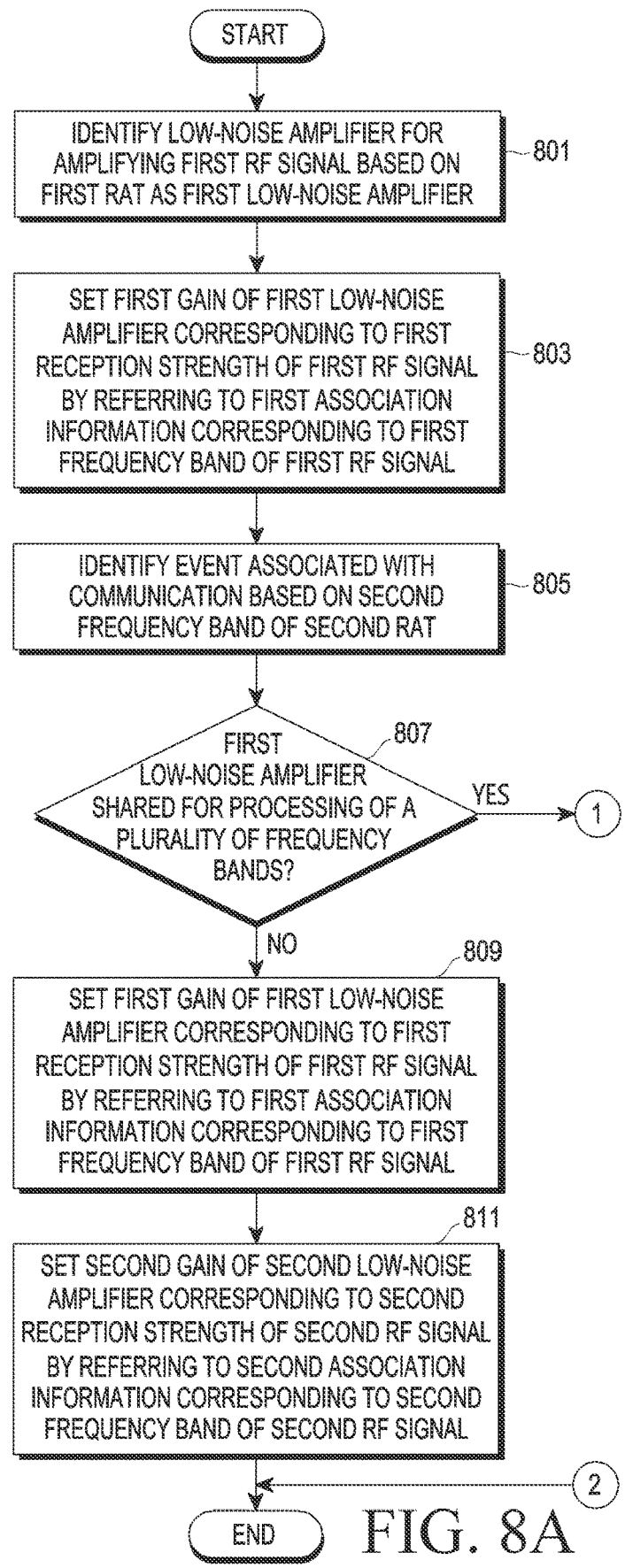

ELECTRONIC DEVICE SUPPORTING COMMUNICATION BASED ON A PLURALITY OF FREQUENCY BANDS AND METHOD FOR OPERATING THE SAME

CROSS-REFERENCE TO RELATED APPLICATION(S)

This application is a continuation application, claiming priority under § 365(c), of an International application No. PCT/KR2022/010733, filed on Jul. 21, 2022, which is based on and claims the benefit of a Korean patent application number 10-2021-0103664, filed on Aug. 6, 2021, in the Korean Intellectual Property Office, the disclosure of which is incorporated by reference herein in its entirety.

BACKGROUND

1. Field

The disclosure relates to an electronic device supporting communication based on a plurality of frequency bands and an operation method thereof, e.g., an electronic device supporting carrier aggregation (CA) and/or dual-connectivity (DC) and an operation thereof.

2. Description of Related Art

To implement 5th generation (5G) communication, standalone (SA) and non-stand alone (NSA) schemes are taken into consideration. Of the two, the NSA scheme may include an evolved-universal terrestrial radio access new radio (E-UTRA NR) dual connectivity (EN-DC) scheme that uses the new radio (NR) system along with the legacy long term evolution (LTE) system. In the NSA scheme, user equipment (UEs) may use the gNBs of the 5th generation system (5GS) as well as the evolved NodeB (eNB) of the evolved packet system (EPS). Technology allowing UEs to use heterogeneous communication systems may be termed dual connectivity. Dual connectivity has been first proposed in 3rd generation partnership project (3GPP) release-12 where a 3.5 GHz frequency band other than that for E-UTRA is used for small cells. The 5G EN-DC scheme may use an E-UTRA-based node as a master node and an NR-based node as a secondary node. The electronic device may perform communication based on a plurality of frequency bands of a first frequency band of E-UTRA and a second frequency band of NR. Or, the electronic device may perform carrier aggregation (CA). The electronic device may perform communication based on a plurality of frequency bands of a first frequency band of a primary component carrier (PCC) and a second frequency band of a secondary component carrier (SCC). Or, the electronic device may simultaneously perform EN-DC and CA.

When communication based on a plurality of frequency bands is performed, such an occasion in which at least some of the center frequencies (or bands) of the plurality of frequency bands are identical may occur. The electronic device may be implemented to process radio frequency (RF) signals of frequency bands which partially overlap or have similar frequencies, using hardware (e.g., a low-noise amplifier (LNA)). For example, the frequency range of the B42 band of E-UTRA may be 3400 to 3600 MHz, and the frequency range of the N78 band of NR may be 3300 to 3800 MHz, and the frequency regions may partially overlap. The designated LNA of the electronic device may be implemented to at least simultaneously process the RF signal of the B42 band and the RF signal of the N78 band. As the designated LNA is implemented to process a plurality of frequency bands, the electronic device may be implemented to include relatively fewer pieces of hardware.

The above information is presented as background information only to assist with an understanding of the disclosure. No determination has been made, and no assertion is made, as to whether any of the above might be applicable as prior art with regard to the disclosure.

The electronic device may control the gain of at least one LNA according to the reception strength (e.g., at least one of reference signal received power (RSRP), reference signal received quality (RSRQ), modulation and coding scheme (MCS), or reference signal strength indicator (RSSI)) of a downlink signal. For example, the electronic device may store association information between reception strength and gain for each of a plurality of frequency bands. Meanwhile, the processing of RF signals for a plurality of frequency bands may be processed in one a low-noise amplifier (LNA). The gain of the LNA corresponding to any one frequency band may be different from the gain of the LNA corresponding to another frequency band. For example, when the reception strength of the radio frequency (RF) signal in the B42 band is −68 dBm, the optimized gain of the LNA may be G3, and when the reception strength of the RF signal in the N78 band is −75 dBm, the optimized gain of the LNA may be G2. If the designated LNA gain is set to G3, the throughput of the N78 band may drop sharply and, if the designated LNA gain is set to G2, the throughput of the B42 band may drop sharply. When the optimized gain for each of the plurality of frequency bands for one LNA differs, the throughput of another frequency band may be drastically reduced.

Aspects of the disclosure are to address at least the above-mentioned problems and/or disadvantages and to provide at least the advantages described below. Accordingly, an aspect of the disclosure is to provide an electronic device and a method for operating the same may set a gain of an LNA based on association information different from per-frequency band association information when at least one LNA is shared in processing the RF signals of a plurality of frequency bands.

According to various embodiments, an electronic device and a method for operating the same may operate at least one attenuator between a radio frequency integrated circuit (RFIC) and an external LNA when at least one LNA is shared in processing RF signals of a plurality of frequency bands.

Additional aspects will be set forth in part in the description which follows and, in part, will be apparent from the description, or may be learned by practice of the presented embodiments.

SUMMARY

According to various embodiments, an electronic device supporting a first radio access technology (RAT) and a second RAT may comprise at least one antenna, at least one low-noise amplifier configured to amplify at least one RF signal output from the at least one antenna, at least one RFIC configured to process at least one amplified RF signal output from the low-noise amplifier, and at least one communication processor receiving at least one processed signal output from the at least one RFIC. The at least one communication processor may be configured to identify a low-noise amplifier for amplifying a first RF signal based on a first frequency band of the first RAT output from at least some of the at least one antenna and a low-noise amplifier for amplifying a second RF signal based on a second frequency band of the second RAT output from at least some of the at least one antenna, from among the at least one low-noise amplifier, based on the low-noise amplifier for amplifying the first RF signal differing from the low-noise amplifier for amplifying the second RF signal, set a first gain of the low-noise amplifier for amplifying the first RF signal corresponding to a first reception strength of the first RF signal, by referring to first association information corresponding to the first frequency band, set a second gain of the low-noise amplifier for amplifying the second RF signal corresponding to a second reception strength of the second RF signal, by referring to second association information corresponding to the second frequency band, based on the low-noise amplifier for amplifying the first RF signal being identical to the low-noise amplifier for amplifying the second RF signal, set a third gain of a low-noise amplifier of amplifying the first RF signal and the second RF signal corresponding to the first reception strength and/or the second reception strength, by referring to third association information at least partially different from the first association information and/or the second association information.

According to various embodiments, a method for operating an electronic device supporting a first RAT and a second RAT may comprise identifying a low-noise amplifier for amplifying a first RF signal based on a first frequency band of the first RAT and a low-noise amplifier for amplifying a second RF signal based on a second frequency band of the second RAT, from among at least one low-noise amplifier of the electronic device, based on the low-noise amplifier for amplifying the first RF signal differing from the low-noise amplifier for amplifying the second RF signal, setting a first gain of the low-noise amplifier for amplifying the first RF signal corresponding to a first reception strength of the first RF signal, by referring to first association information corresponding to the first frequency band, and setting a second gain of the low-noise amplifier for amplifying the second RF signal corresponding to a second reception strength of the second RF signal, by referring to second association information corresponding to the second frequency band, based on the low-noise amplifier for amplifying the first RF signal being identical to the low-noise amplifier for amplifying the second RF signal, setting a third gain of a low-noise amplifier of amplifying the first RF signal and the second RF signal corresponding to the first reception strength and/or the second reception strength, by referring to third association information at least partially different from the first association information and/or the second association information.

According to various embodiments, an electronic device supporting a first RAT and a second RAT may comprise at least one antenna, at least one low-noise amplifier configured to amplify at least one RF signal output from the at least one antenna, at least one RFIC configured to process at least one amplified RF signal output from the low-noise amplifier, at least one attenuator connected between the at least one RFIC and the at least one low-noise amplifier, and at least one communication processor receiving at least one processed signal output from the at least one RFIC. The at least one communication processor may be configured to identify a first low-noise amplifier among the at least one low-noise amplifier, as a low-noise amplifier for amplifying a first RF signal based on the first RAT and a second RF signal based on the second RAT output from at least some of the at least one antenna, set a setting value of the first low-noise amplifier as a first setting value to amplify the first RF signal and the second RF signal, and identify whether at least one first attenuator connected to the first low-noise amplifier among the at least one attenuator is operated, based on a first reception strength of the first RF signal and a second reception strength of the second RF signal.

According to various embodiments, a method for operating an electronic device supporting a first RAT and a second RAT may comprise identifying a first low-noise amplifier among at least one low-noise amplifier, as a low-noise amplifier for amplifying a first RF signal based on the first RAT and a second RF signal based on the second RAT, setting a setting value of the first low-noise amplifier as a first setting value to amplify the first RF signal and the second RF signal, and identifying whether at least one first attenuator connected to the first low-noise amplifier is operated based on a first reception strength of the first RF signal and a second reception strength of the second RF signal.

According to various embodiments, there may be provided an electronic device and a method for operating the same which may set a gain of an LNA based on association information different from per-frequency band association information when at least one LNA is shared in processing the RF signals of a plurality of frequency bands.

According to various embodiments, there may be provided an electronic device and a method for operating the same which may operate at least one attenuator between a radio frequency integrated circuit (RFIC) and an external LNA when at least one LNA is shared in processing RF signals of a plurality of frequency bands.

Thus, it is possible to prevent a throughput drop due to mismatch between optimized gains when at least one LNA is shared in processing per-frequency band RF signals.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which:

FIGS. 8A and 8B are flowcharts illustrating an operation method of an electronic device according to various embodiments;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
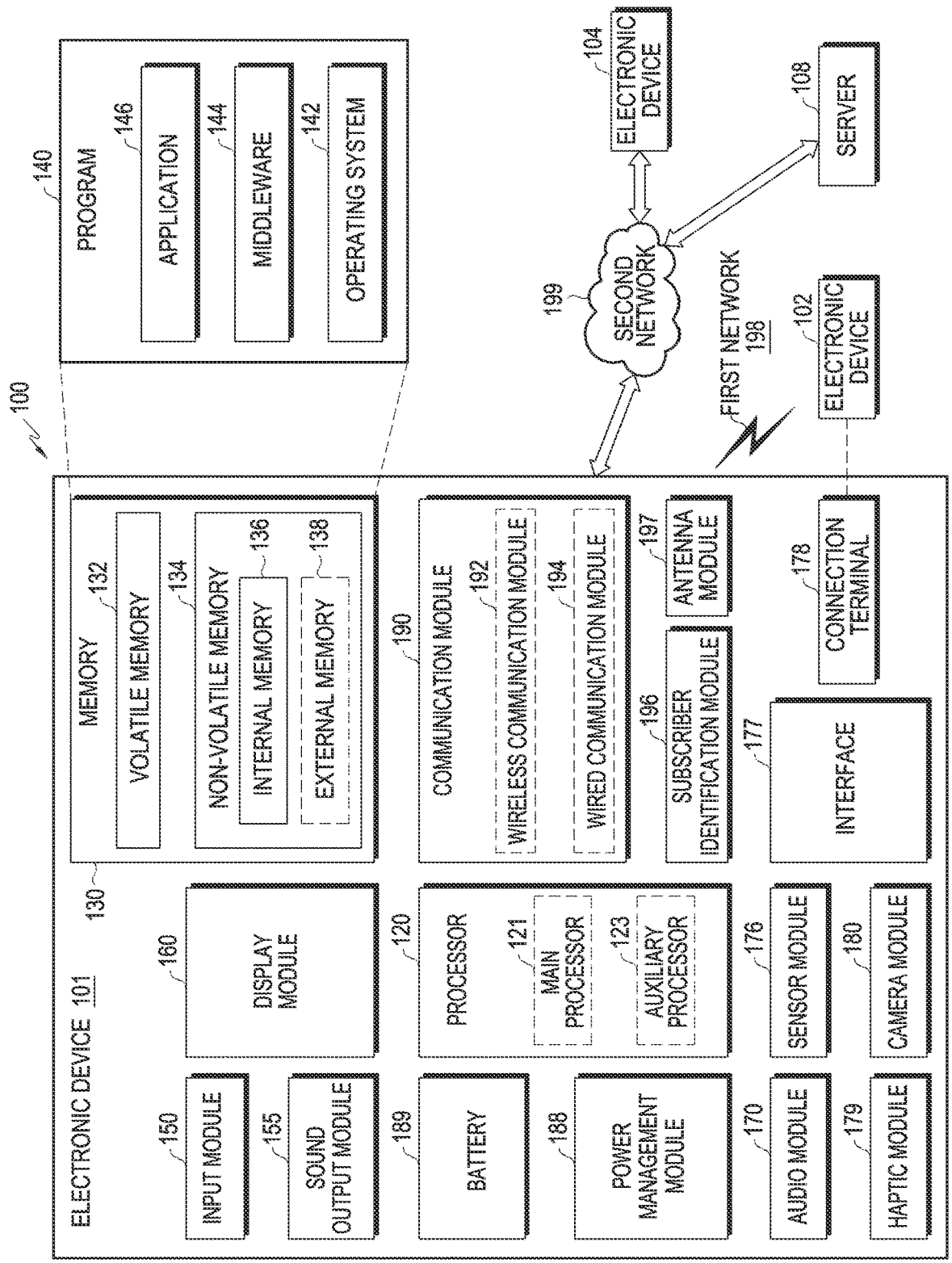
FIG. 1 is a view illustrating an electronic device in a network environment according to various embodiments.

FIG. 1 is a block diagram illustrating an electronic device in a network environment according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the millimeter wave (mmWave) band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
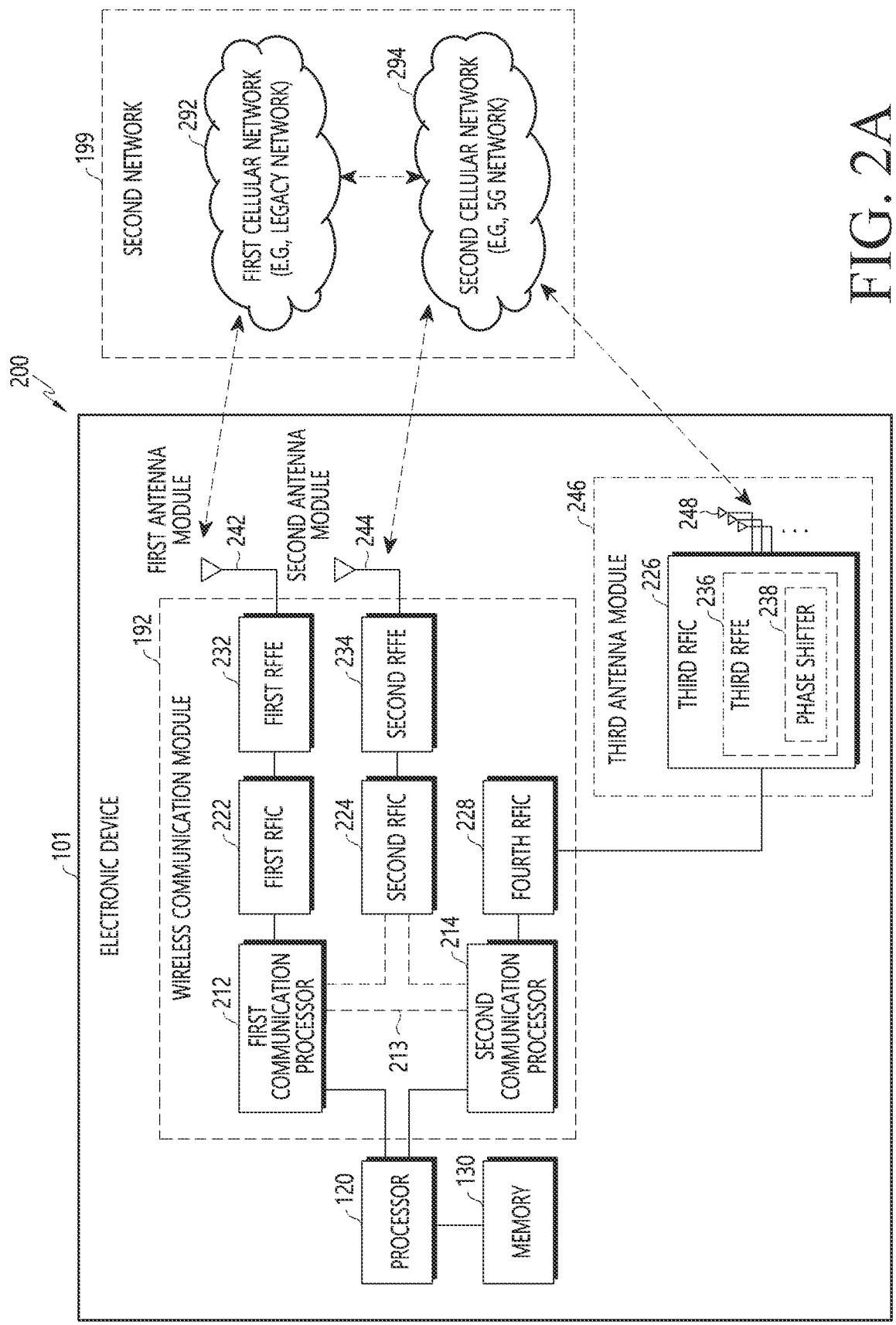
FIG. 2A is a block diagram illustrating an electronic device for supporting legacy network communication and 5G network communication according to various embodiments.

FIG. 2A is a block diagram 200 illustrating an electronic device 101 for supporting legacy network communication and 5G network communication according to various embodiments.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. The first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. The first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package.

Figure 2B:
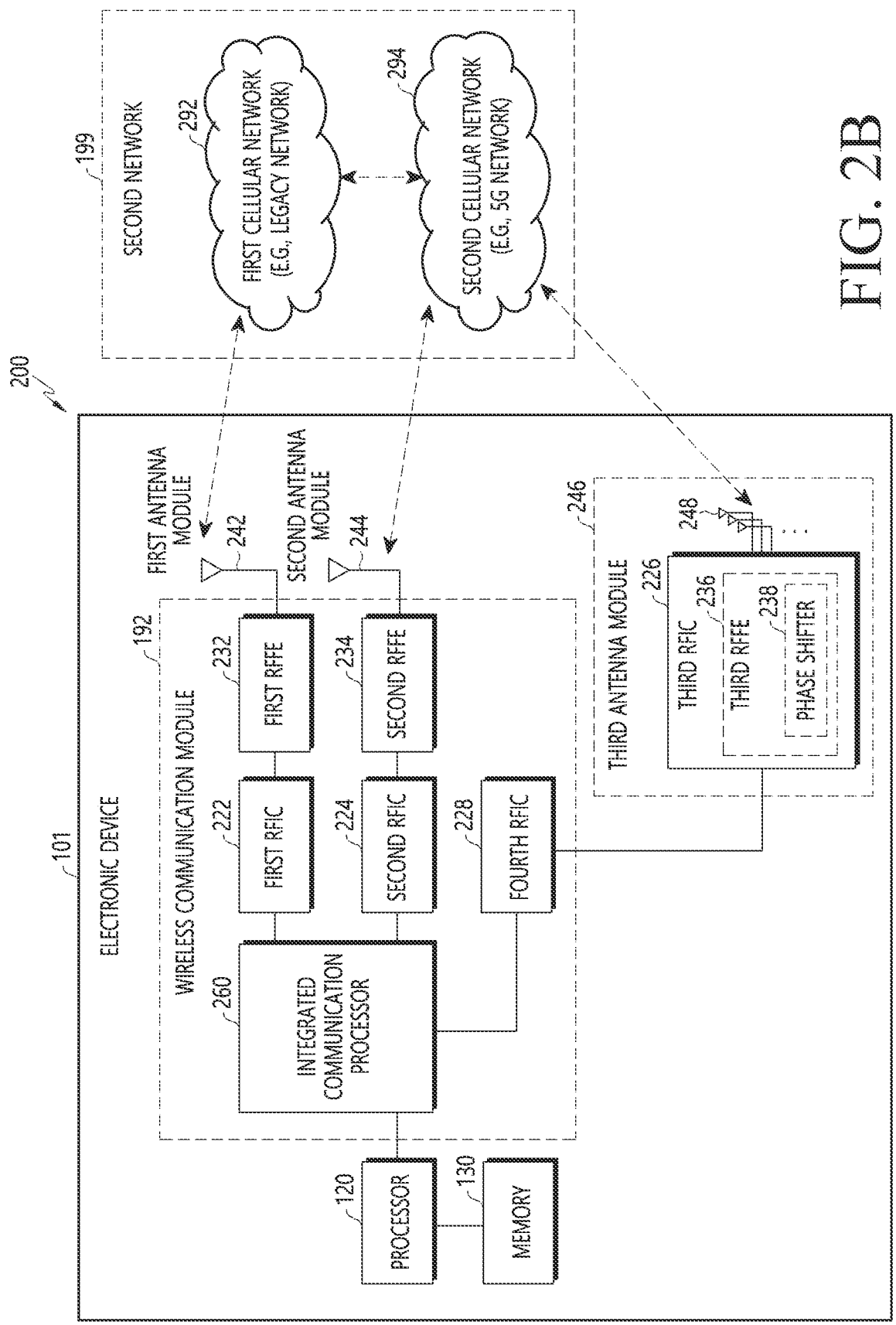
FIG. 2B is a block diagram illustrating an electronic device for supporting legacy network communication and 5G network communication according to various embodiments.

FIG. 2B is a block diagram illustrating an electronic device for supporting legacy network communication and 5G network communication according to various embodiments Referring to FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. The fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. The integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). The third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. The third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). The electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3:
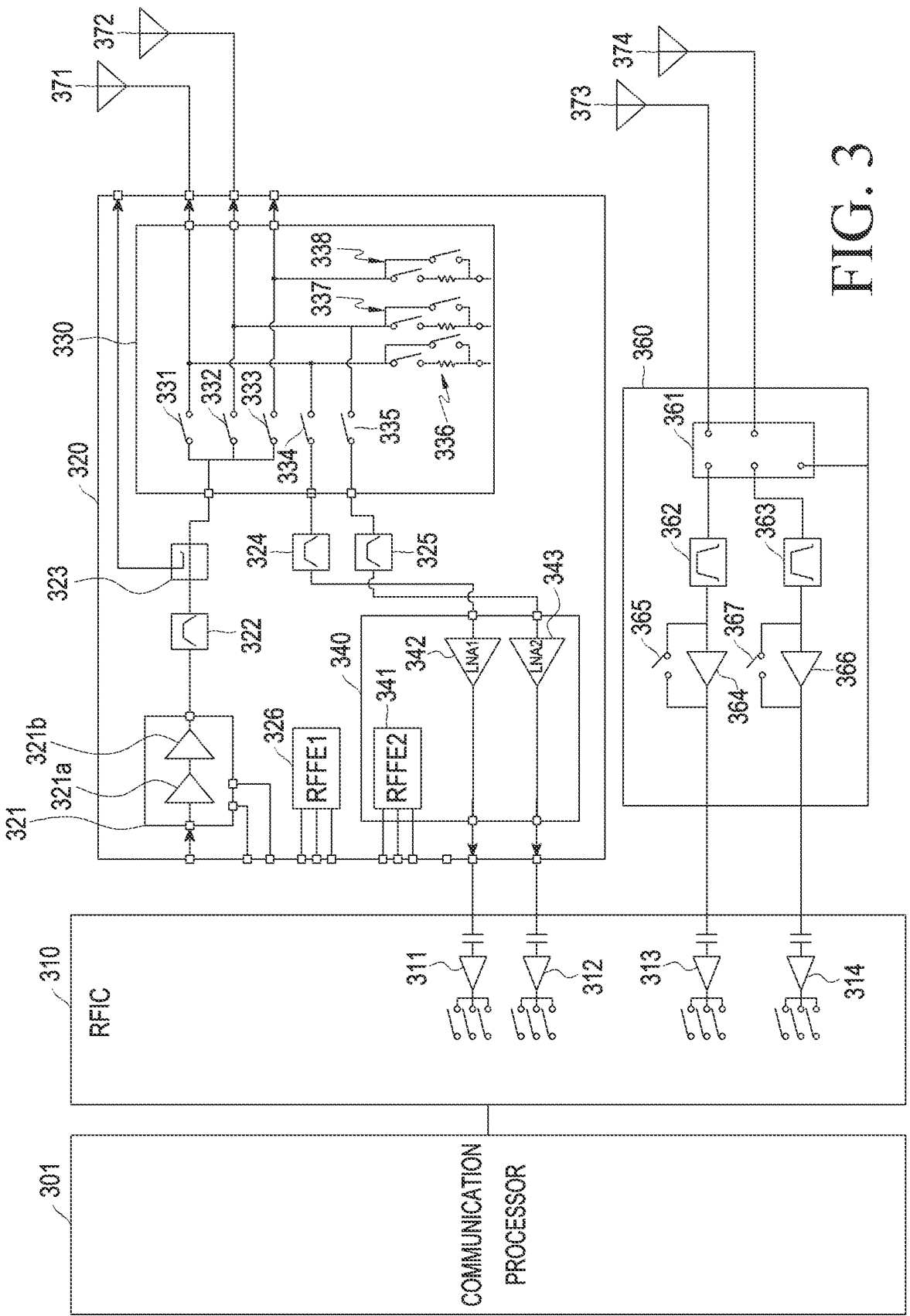
FIG. 3 is a block diagram illustrating an electronic device according to various embodiments.

FIG. 3 is a block diagram illustrating an electronic device according to various embodiments. The embodiment of FIG. 3 is described with reference to FIG. 4.

Figure 4:
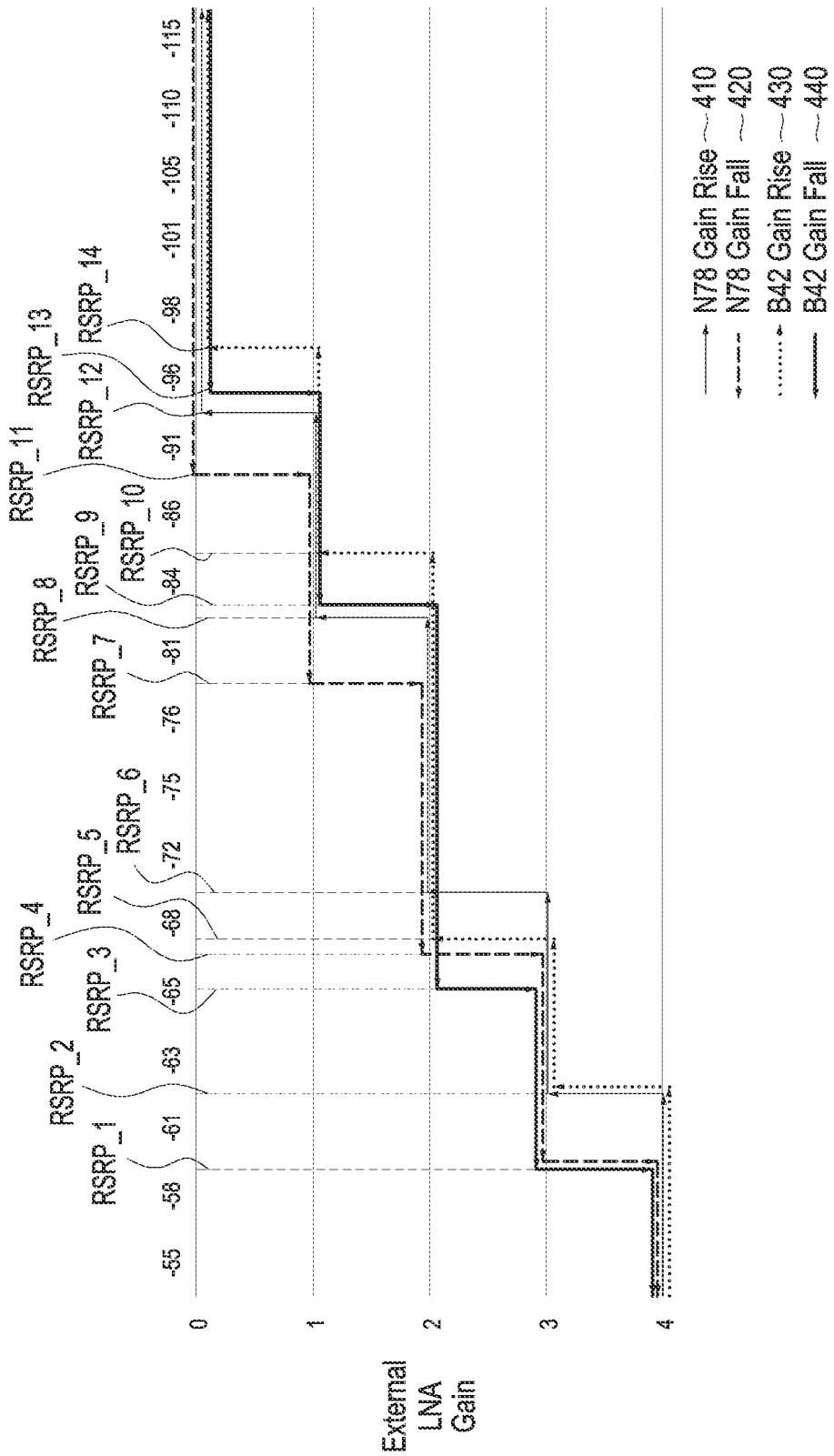
FIG. 4 is a view illustrating an LNA gain for each reception strength according to various embodiments.

FIG. 4 is a view illustrating an LNA gain for each reception strength according to various embodiments.

Referring to FIG. 3, the communication processor 301 (e.g., at least one of the first communication processor 212, the second communication processor 214, or the integrated communication processor 260) may be connected to an RFIC 310 (e.g., at least one of the first RFIC 222, the second RFIC 224, the third RFIC 226, or the fourth RFIC 228). The RFIC 310 may be connected to an RFFE 320 and an RFFE 360. The RFFE 320 and the RFFE 360 may be, e.g., at least one of the first RFFE 232, the second RFFE 234, or the third RFFE 236 of FIG. 2A or 2B. The RFFE 320 may be connected with, e.g., primary receive (PRX) antennas 371 and 372. The RFFE 360 may be connected with, e.g., discontinuous reception (DRX) antennas 373 and 374. The RFIC 310 may receive a signal (e.g., a baseband signal) from the communication processor 301. The RFIC 310 may generate an RF signal for transmission based on the received signal. The RF signal for transmission generated by the RFIC 310 may be provided to at least some of the PRX antennas 371 and 372.

According to various embodiments, the RFFE 320 may provide the RF signal for transmission received from the RFIC 310 to at least some of the PRX antennas 371 and 372. The RFFE 320 may include an amplification circuit 321. The amplification circuit 321 may include at least one power amplifier (PA) 321a and 321b. At least one PA 321a and 321b may amplify the RF signal for transmission received from the RFIC 310. The amplified RF signal may be filtered by the filter 322. The filtered RF signal may be provided to an antenna switch system 330. The state of at least some of the switches 331, 332, 333, 335, 336, 337, and 338 of the antenna switch system 330 may be controlled such that the filtered RF signal is provided to at least some of the PRX antennas 371 and 372. For example, when an RF signal for transmission is provided to the PRX antenna 371, the switch 331 may be controlled to be turned on. The coupler 323 may provide a coupling signal for measuring the magnitude of the RF signal for transmission. The first RFFE controller 326 may perform control for providing an RF signal for transmission.

According to various embodiments, the RFFE 320 and/or the RFFE 360 may process the RF signal for reception output from at least some of the antennas 371, 372, 373, and 374, and provide it to the RFIC 310. The RFIC 310 may process the RF signal received from the RFFE 320 and/or the RFFE 360 to generate a signal (e.g., a baseband signal). The RFIC 310 may provide the generated signal to the communication processor 301. The PRX antennas 371 and 372 may receive an RF signal for transmission and radiate electromagnetic waves. Or, the PRX antennas 371 and 372 may output an RF signal for reception corresponding to an external electromagnetic wave. The DRX antennas 373 and 374 may output RF signals for reception corresponding to external electromagnetic waves. For example, when the RF signal for reception is output from the PRX antenna 371, the switch 334 of the antenna switch system 330 may be controlled to be turned on. The RF signal for reception from the PRX antenna 371 may pass through the filter 324 and be provided to the low-noise amplification circuit 340. The low-noise amplification circuit 340 may include at least one low-noise amplifier 342 and 343. The at least one low-noise amplifier 342 and 343 may pass through the filters 324 and 325, respectively, to amplify the provided RF signal. The second RFFE controller 341 may perform control for processing the RF signal for reception. The RFFE 360 may process RF signals for reception from the DRX antennas 373 and 374 and provide them to the RFIC 310. The antenna switch system 361 of the RFFE 360 may selectively connect at least some of the DRX antennas 373 and 374 to at least some of the filters 362 and 363. The low-noise amplifiers 364 and 366 may amplify the RF signals, which are provided through the filters 362 and 363, and provide them to the RFIC 310. When the switches 365 and 367 are controlled to be turned on, the RF signal for reception may bypass the low-noise amplifiers 364 and 366 and be provided to the RFIC 310. The RFIC 310 may include low-noise amplifiers 311, 312, 313, and 314. Each of the low-noise amplifiers 311, 312, 313, and 314 may amplify an RF signal for reception provided from at least some of the RFFEs 320 and 360. For convenience of description, the low-noise amplifiers 311, 312, 313, and 314 included in the RFIC 310 may be referred to as internal low-noise amplifiers, and the low-noise amplifiers 342, 343, 364, and 366 disposed outside the RFIC 310 may be referred to as external low-noise amplifiers.

According to various embodiments, the electronic device 101 may determine the gains of at least some of the low-noise amplifiers 342, 343, 364, and 366. The electronic device 101 may determine the gains of at least some of the low-noise amplifiers 311, 312, 313, and 314. The gain modes of the low-noise amplifiers 342, 343, 364, and 366 may be implemented as modes, such as G0, G1, G2, G3, and G4, for example. The modes G0, G1, G2, G3, and G4 of the external low-noise amplifiers may be, e.g., modes that include factors of gain (dB), Desense (dB), and/or default sensitivity (dBm), and factors included in the modes are not limited. In the disclosure, the gain mode of an external low-noise amplifier may be described interchangeably with the gain value. The gains of the low noise amplifiers 311, 312, 313, and 314 may be implemented as modes, such as G0, G1, G2, G3, G4, G5, G6, G7, G8, G9, and G10, for example. The modes G0, G1, G2, G3, G4, G5, G6, G7, G8, G9, and G10 of the internal low-noise amplifiers may be, e.g., modes that include factors of IIP3 (dBm), NF(dB), Desense (dB), and/or default sensitivity (dBm), but factors included in the modes are not limited. In the disclosure, the gain mode of an external low-noise amplifier may be described interchangeably with the gain value. Meanwhile, it will be understood by one of ordinary skill in the art that there is no limitation on the implementation form of the mode. The gains and bias of the low-noise amplifiers 311, 312, 313, 314, 342, 343, 364, and 366 and/or the analog baseband (ABB) circuit gain of the RFIC 310 may be preset as optimized values considering the applied current, noise figure, and/or linearity (e.g., P1dB, IP3dB) of the low-noise amplifier. For example, the electronic device 101 may previously store association information between the reception strength (e.g., RSRP, RSSI, MCS, and/or RSRQ) (or range of reception strength) of the RF signal for reception, the gains and bias of the low-noise amplifiers 311, 312, 313, 314, 342, 343, 364, and 366, and/or the analog baseband (ABB) circuit gain of the RFIC 310. The association information may be determined according to an experiment and stored in the electronic device 101. The association information may be updated according to implementation.

For example, it is assumed that the antennas 371, 372, 373, and 374 of FIG. 3 support the B42 band and B48 band of E-UTRA and the N77 band and N78 band of NR. It is also assumed that the hardware (e.g., the PAs 321a and 321b and the low-noise amplifiers 342, 343, 364, and 366) corresponding to the antennas 371, 372, 373, and 374 support the B42 band and B48 band of E-UTRA and the N77 band and N78 band of NR. The electronic device 101 may store, e.g., association information between frequency band and its corresponding hardware. The electronic device 101 may select the hardware corresponding to the frequency band based on the stored association information. Or, the electronic device 101 may store association information between RF path and frequency band. The RF path may mean, e.g., a set of at least one piece of hardware associated with processing for transmission of an RF signal and/or a set of at least one piece of hardware associated with processing of reception of an RF signal, and may be managed through, e.g., numbering, but is not limited thereto. The electronic device 101 may select an RF path, i.e., select at least one piece of hardware for processing, based on association information between RF path and frequency band. Table 1 shows information associated with the B42 band, B48 band, N77 band, and N78 band.

TABLE 1

| RAT | Frequency band | Center frequency (MHz) | Frequency range (MHz) |
|---|---|---|---|
| E-UTRA | B42 | 3500 | 3400 through 3600 |
| | B48 | 3500 | 3550 through 3700 |
| NR | N77 | 3700 | 3300 through 4200 |
| | N78 | 3500 | 3300 through 3800 |

As shown in Table 1, at least some of the frequency regions of the B42 band, the B48 band, the N77 band, and the N78 band may overlap each other. Accordingly, the reception RF signals of two or more bands among the bands may be shared by at least one LNA (e.g., at least one of the LNAs 342, 343, 364, and 366) and amplified.

Meanwhile, as described above, association information between the reception strength (or range of reception strength) of the reception RF signal and the gains of the low-noise amplifier 342, 343, 364, and 366 may be stored. According to various embodiments, the electronic device 101 may store association information between the reception strength (or range of reception strength) of reception RF signal and gains of the low-noise amplifiers 342, 343, 364, and 366, for each frequency band.

For example, FIG. 4 shows association information 410 and 420 between the range of reception strength for the N78 band and the gain of the external low-noise amplifier and association information 430 and 440 between the range of reception strength for the B42 band and the gain of the external low-noise amplifier. Meanwhile, to ensure stable communication between the network and the electronic device 101, a threshold having a hysteresis characteristic for an increase and decrease in the gain of the low-noise amplifier may be set.

For example, the association information 410 between reception strength and an increase in the gain of the external low-noise amplifier for the N78 band of FIG. 4 is referenced. When the reception strength of the RF signal of the N78 band is RSRP_2, the gain of the low-noise amplifier may be increased from G4 to G3. When the reception strength of the RF signal of the N78 band is RSRP_6, the gain of the low-noise amplifier may be increased from G3 to G2. When the reception strength of the RF signal of the N78 band is RSRP_8, the gain of the low-noise amplifier may be increased from G2 to G1. When the reception strength of the RF signal of the N78 band is RSRP_12, the gain of the low-noise amplifier may be increased from G1 to G0. G0 may correspond to the highest gain, and that G4 may correspond to the lowest gain.

For example, referring to FIG. 4, it may be identified that as the reception strength decreases, a relatively large gain is required so that the gain is switched from G4 to G0. For example, the gain value corresponding to G0 may be 19 dB, the gain value corresponding to G1 may be 16.4 dB, the gain value corresponding to G2 may be 11.9 dB, the gain value corresponding to G3 may be −3.1 dB, and the gain value corresponding to G4 may be −4.2 dB. However, this is merely an example.

For example, the association information 420 between reception strength and a decrease in the gain of the external low-noise amplifier for the N78 band of FIG. 4 is referenced. When the reception strength of the RF signal of the N78 band is RSRP_11, the gain of the low-noise amplifier may be decreased from G0 to G1. When the reception strength of the RF signal of the N78 band is RSRP_7, the gain of the low-noise amplifier may be decreased from G1 to G2. When the reception strength of the RF signal of the N78 band is RSRP_4, the gain of the low-noise amplifier may be decreased from G2 to G3. When the reception strength of the RF signal of the N78 band is RSRP_1, the gain of the low-noise amplifier may be decreased from G3 to G4. As described above, thresholds may be set to have hysteresis characteristics for an increase and decrease in gain.

For example, the association information 430 between reception strength and an increase in the gain of the external low-noise amplifier for the B42 band of FIG. 4 is referenced. When the reception strength of the RF signal of the B42 band is RSRP_2, the gain of the low-noise amplifier may be increased from G4 to G3. When the reception strength of the RF signal of the B42 band is RSRP_5, the gain of the low-noise amplifier may be increased from G3 to G2. When the reception strength of the RF signal of the B42 band is RSRP_10, the gain of the low-noise amplifier may be increased from G2 to G1. When the reception strength of the RF signal of the B42 band is RSRP_14, the gain of the low-noise amplifier may be increased from G1 to G0.

For example, the association information 440 between reception strength and a decrease in the gain of the external low-noise amplifier for the B42 band of FIG. 4 is referenced. When the reception strength of the RF signal of the B42 band is RSRP_13, the gain of the low-noise amplifier may be decreased from G0 to G1. When the reception strength of the RF signal of the B42 band is RSRP_9, the gain of the low-noise amplifier may be decreased from G1 to G2. When the reception strength of the RF signal of the B42 band is RSRP_3, the gain of the low-noise amplifier may be decreased from G2 to G3. When the reception strength of the RF signal of the B42 band is RSRP_1, the gain of the low-noise amplifier may be decreased from G3 to G4. As described above, thresholds may be set to have hysteresis characteristics for an increase and decrease in gain.

As described above, for the N78 band for the B42 band, different association information may be set. When the electronic device 101 uses EN-DC, the B42 band and the N78 band may be set from the network. At least some of the low-noise amplifiers 342, 343, 364, and 366 may be shared for amplification of the RF signal of the B42 band and amplification of the RF signal of the N78 band. For example, when the reception strength of the RF signal of the B42 band is between RSRP_5 and RSRP_6 in the process of increasing the gain, the gain corresponding to the B42 band may be G2. For example, when the reception strength of the RF signal of the N78 band is between RSRP_5 and RSRP_6 in the process of increasing the gain, the gain corresponding to the N78 band may be G3. If the gain of the shared low-noise amplifier is set to G2, there is the throughput for the N78 band may drop sharply. If the gain of the shared low-noise amplifier is set to G3, the throughput for the B42 band may drop sharply. According to various embodiments, when at least one low-noise amplifier is shared for processing of a plurality of RF signals, the electronic device 101 may determine a gain using association information different from the association information 410, 420, 430, and 440 of FIG. 4. When no low-noise amplifier is shared for processing of a plurality of RF signals, the electronic device 101 may determine a gain for each low-noise amplifier using associated information (e.g., 410, 420, 430, and 440) set for each frequency band. Meanwhile, it will be understood by one of ordinary skill in the art that the reception strength being expressed in RSRP in the above example is merely exemplary, and the type of reception strength is not limited but a plurality of factors may be considered.

In the above-described example, the electronic device 101 may store association information when the gain is increased between the range of reception strength for the B42 band as shown in Table 2 and the gain of the external low-noise amplifier.

TABLE 2

| Reception strength (RSRP) | more than RSRP_2 | more than RSRP_2 or RSRP_5 or less | more than RSRP_5 or RSRP_10 or less | more than RSRP_10 or RSRP_14 or less | RSRP_14 or less |
|---|---|---|---|---|---|
| External low-noise amplifier gain (mode) | G4 | G3 | G2 | G1 | G0 |

In the above-described example, the electronic device 101 may store association information when the gain is decreased between the range of reception strength for the B42 band as shown in Table 3 and the gain of the external low-noise amplifier.

TABLE 3

| Reception strength (RSRP) | less than RSRP_13 | RSRP_13 or more, and less than RSRP_9 | RSRP_9 or more, less than RSRP_3 | RSRP_3 or more less than RSRP_1 | RSRP_1 or more |
|---|---|---|---|---|---|
| External low-noise amplifier gain (mode) | G0 | G1 | G2 | G3 | G4 |

Or, the electronic device 101 may store information about the threshold for changing the gain as shown in Tables 4 and 5, but this may also be an example of association information between reception strength and the gain of the low-noise amplifier. Table 4 may be information about the threshold when the gain increases, and Table 5 may be information about the threshold when the gain decreases.

TABLE 4

| Reception strength (RSRP) | RSRP_2 | RSRP_5 | RSRP_10 | RSRP_14 |
|---|---|---|---|---|
| change of external low-noise amplifier gain (mode) | G4 ⇒ G3 | G3 ⇒ G2 | G2 ⇒ G1 | G1 ⇒ G0 |

TABLE 5

| Reception strength (RSRP) | RSRP_13 | RSRP_9 | RSRP_3 | RSRP_1 |
|---|---|---|---|---|
| change of external low-noise amplifier gain (mode) | G0 ⇒ G1 | G1 ⇒ G2 | G2 ⇒ G3 | G3 ⇒ G4 |

The thresholds of reception strength in Tables 4 and 5 may be referred to as switching points. Meanwhile, in another example, the electronic device 101 may be implemented to include association information including a value for a hysteresis characteristic and/or variation in reception strength required for a gain switch with respect to the prior gain-switched reception strength, and the form of implementing association information is not limited.

Tables 6 and 7, respectively, may store association information when the gain increases and when the gain decreases, between the range of reception strength for the N78 band and the gain of the external low-noise amplifier.

TABLE 6

| Reception strength (RSRP) | more than RSRP_2 | RSRP_2 or less, and more than RSRP_6 | RSRSP_6 or less, more than RSRP_8 | RSRP_8 or less more than RSRP_12 | RSRP_12 or less |
|---|---|---|---|---|---|
| External low-noise amplifier gain (mode) | G4 | G3 | G2 | G1 | G0 |

TABLE 7

| Reception strength (RSRP) | more than RSRP_11 | RSRP_11 or more, and less than RSRP_7 | RSRSP_7 or more, less than RSRP_4 | RSRP_4 or more less than RSRP_1 | RSRP_1 or more |
|---|---|---|---|---|---|
| External low-noise amplifier gain (mode) | G0 | G1 | G2 | G3 | G4 |

Table 8 may be information about the threshold when the gain increases for the N78 band, and Table 9 may be information about the threshold when the gain decreases for the band.

TABLE 8

| Reception strength (RSRP) | RSRP_2 | RSRP_6 | RSRP_8 | RSRP_12 |
|---|---|---|---|---|
| change of external low-noise amplifier gain (mode) | G4 ⇒ G3 | G3 ⇒ G2 | G2 ⇒ G1 | G1 ⇒ G0 |

TABLE 9

| Reception strength (RSRP) | RSRP_11 | RSRP_7 | RSRP_4 | RSRP_1 |
|---|---|---|---|---|
| change of external low-noise amplifier gain (mode) | G0 ⇒ G1 | G1 ⇒ G2 | G2 ⇒ G3 | G3 ⇒ G4 |

Meanwhile, setting the threshold to have a hysteresis characteristic for an increase and decrease in gain as described above is merely an example and, according to various embodiments, a threshold for a gain switch may be set not to have the hysteresis characteristic.

For example, in a case where the low-noise amplifier 342 is determined to process the RF signal of the B42 band, and the low-noise amplifier 342 is not shared for processing of the RF signal of another frequency band, the electronic device 101 may determine the gain of the low-noise amplifier 342 corresponding to the reception strength of the RF signal of the B42 band using the first association information, such as at least some of Tables 2 to 5. For example, in a case where the low-noise amplifier 342 is determined to process the RF signal of the N78 band, and the low-noise amplifier 342 is not shared for processing of the RF signal of another frequency band, the electronic device 101 may determine the gain of the low-noise amplifier 342 corresponding to the reception strength of the RF signal of the N78 band using the second association information, such as at least some of Tables 6 to 9. According to various embodiments, in a case where the low-noise amplifier 342 is shared for processing of the RF signal of the B42 band and the RF signal of the N78 band, the electronic device 101 may determine the gain of the low-noise amplifier 342 using the third association information different from the first association information and the second association information. The third association information may be information for optimization when hardware is shared for processing of a plurality of RF signals, and various examples of the third association information are described below.

Figure 5A:
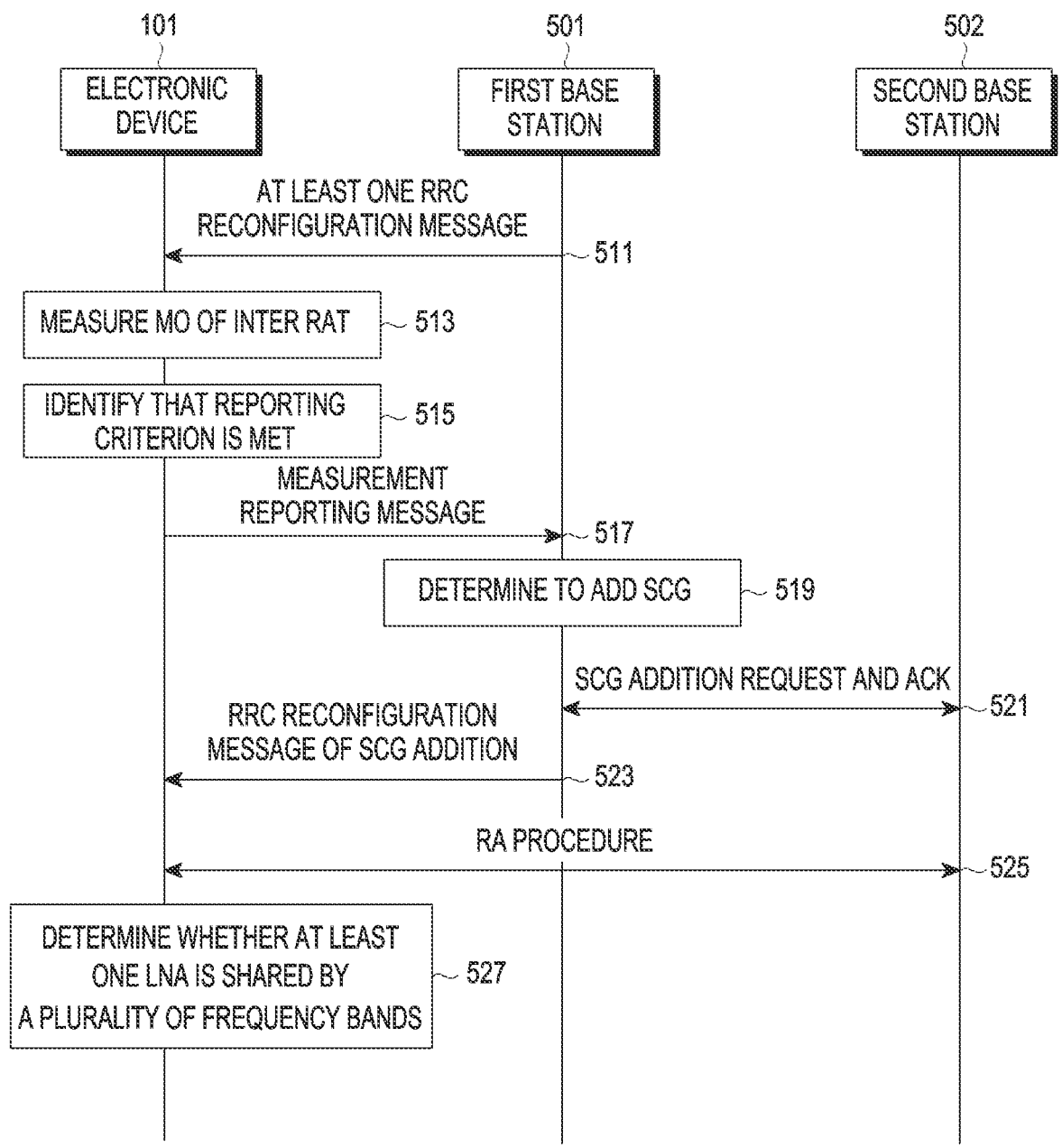
FIG. 5A is a flowchart illustrating operations of an electronic device and a network according to various embodiments.

FIG. 5A is a flowchart illustrating operations of an electronic device and a network according to various embodiments. The embodiment of FIG. 5A is described with reference to FIG. 5B.

Figure 5B:
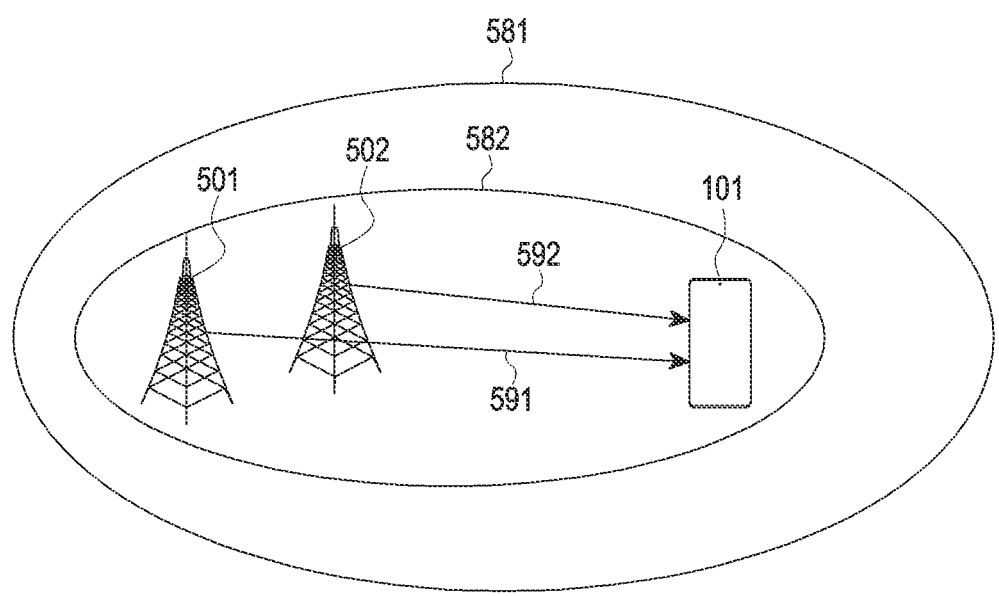
FIG. 5B is a flowchart illustrating operations of an electronic device and a network according to various embodiments.

FIG. 5B is a flowchart illustrating operations of an electronic device and a network according to various embodiments.

Referring to FIG. 5A, an electronic device 101 (e.g., at least one of the first communication processor 212, the second communication processor 214, the integrated communication processor 260, or the communication processor 301) may receive at least one radio resource control (RRC) reconfiguration message (e.g., an RRC connection reconfiguration message of 3rd generation project partnership (3GPP) technical specification (TS) 36.331 or an RRC reconfiguration message of 3GPP TS 38.331) from a first base station 501 in operation 511. For example, the electronic device 101 may receive at least one RRC reconfiguration message in a state connected to the first base station 501 of a first RAT. Meanwhile, in a case where at least some of the functions are virtualized, the first base station 501 may be implemented as at least some of hardware of radio control and servers for performing the virtualized functions. The first base station 501 may be named a serving cell or anchor cell. When the electronic device 101 is in, e.g., an RRC connected state (RRC CONNECTED state), an RRC connection reconfiguration procedure may be performed. For example, if the RRC connection reconfiguration message includes a measurement configuration (e.g., measConfig of 3GPP TS 38.331 or 36.331), the electronic device 101 may perform a measurement configuration procedure (e.g., the measurement configuration procedure set forth in 3GPP TS 38.331 or 36.331). For example, the electronic device 101 may be requested to perform the following types of measurement.

intra-frequency measurement: measurement at downlink carrier frequency(ies) of serving cell(s).

inter-frequency measurement: measurement at frequencies different from any frequency among downlink carrier frequency(ies) of serving cell(s).

measurement in the frequency of inter-RAT (e.g., NR, UTRA, global system for mobile communications edge radio access network (GERAN), code division multiple access (CDMA) 2000 high rate packet data (HRPD) or CDMA 2000 1×RTT).

The measurement configuration may include information about the measurement object. The measurement object may include, e.g., the subcarrier spacing and frequency/time positions of the reference signal to be measured. The electronic device 101 may identify the frequency for measurement based on the measurement object in the measurement configuration. The measurement object may also include information indicating a frequency to be measured (e.g., absolute radio-frequency channel number (ARFCN)-ValueEUTRA and/or ARFCN-ValueNR), a measurement object identity, or a blacklist and/or whitelist of cells. For example, the measure object of inter RAT may include an ARFCN-Value associated with the second RAT of a second base station 502.

According to an embodiment, the measurement configuration of the RRC connection reconfiguration message may include a reporting configuration. For example, the reporting configuration may include at least one of a reporting criterion, a reporting format, or an RS type, but not limited thereto. The reporting criterion is a condition to trigger the UE to transmit a measurement report and may be a periodic or single event description. For, e.g., LTE communication, the reporting format may be information about quantity and relevant information (e.g., the number of cells to be reported) that the UE includes in the measurement report. For, e.g., 5G communication, the reporting format may be per-cell and per-beam quantity and other related information (e.g., the maximum per-cell number and the maximum number of cells to be reported) that is to be included in the measurement report. The RS type may denote, e.g., the RS of the beam to be used by the UE and the measurement result.

According to an embodiment, the measurement configuration of the RRC connection reconfiguration message may include at least one of measurement identity, quantity configuration, or measurement gap. The measurement identity may be a list of measurement identities associated with the measurement object. The quantity configuration may define a measurement filtering configuration and periodic reporting of measurement used in all event evaluation and related reporting. The measurement gap may be the period when the UE perform measurement, e.g., an interval during which uplink or downlink transmission is not scheduled.

The electronic device 101 may perform measurement on at least one of a reference signal received power (RSRP), reference signal received quality (RSRQ), reference signal strength indicator (RSSI), or signal to interference-plus-noise ratio (SINR) corresponding to at least one of inter-frequency, intra-frequency, or inter-RAT according to the measurement configuration. "Electronic device 101 performs RSRP measurement" may mean that at least one of the processor 120, the first communication processor 212, the second communication processor 214, the integrated communication processor 260, or the communication processor 301 identifies the RSRP measurements, but not limited thereto. For example, the electronic device 101 may identify the linear average of power distributions (in watts (W)) of the resource element carrying at least one of the reference signal or synchronization signal in the frequency bandwidth to be measured, as the RSRP measurement. Meanwhile, the reference signal and the synchronization signal are not limited to specific signals but may be any signal defined in the 3GPP. For example, the electronic device 101 may identify the RSRP measurement based on the linear average of the power distributions at the reference point. For example, in the case of LTE communication, the electronic device 101 may identify the RSRP measurement based on the linear average of the power distributions at the antenna connector of the antenna (e.g., the first antenna module 242) receiving the communication signal. For example, in the case of FR1 of NR, the electronic device 101 may identify the RSRP measurement based on the linear average of the power distributions at the antenna connector of the antenna (e.g., the second antenna module 244) receiving the communication signal. For example, in the case of FR2 of NR, the electronic device 101 may identify a measurement (e.g., a synchronization signal-reference signal received power (SS-RSRP)) based on a combined signal from the antenna element (e.g., at least one antenna element of the antenna 248) corresponding to a given receiver branch. Although not shown, the electronic device 101 may include at least one sensor (e.g., at least one of a voltage sensor, a current sensor, or a power sensor) capable of measuring the power at the reference point (e.g., the antenna connector) and measure the power at the reference point based on the sensing data from at least one sensor. As described above, since the reference point is not limited to a specific one, no restriction is imposed on the position where at least one sensor is connected. According to an embodiment, "electronic device 101 performs RSRQ measurement" may mean that at least one of the processor 120, the first communication processor 212, the second communication processor 214, the integrated communication processor 260, or the communication processor 301 identifies the RSRQ measurements, but not limited thereto.

The electronic device 101 may identify that the measurement result meets the measurement condition. The electronic device 101 may identify the measurement result from the, e.g., the physical layer, and the electronic device 101 may determine whether the reporting criterion associated with the measurement object is met based on the measurement result. The electronic device 101 may perform filtering (e.g., layer 3 filtering) on the result and determine whether the reporting criterion is met based on the result of the filtering. According to an embodiment, "measurement result" may denote at least one of, e.g., a value obtained from the physical layer or a value resultant from filtering the value obtained from the physical layer. The reporting criteria associated with inter-RAT may include, but are not limited to, the following:

B1 event: Inter RAT neighbor becomes better than threshold.

B2 event: PCell becomes worse than threshold1 and inter RAT neighbor becomes better than threshold2.

The above-enumerated reporting criteria may follow, e.g., 3GPP TS 36.331 or 3GPP TS 38.331 but are not limited to a specific kind.

According to various embodiments, in operation 513, the electronic device 101 may perform measurement on the measurement object of inter-RAT. For example, the electronic device 101 may perform measurement based on a signal (e.g., a synchronization signal and/or a reference signal) from the second base station 502. In operation 515, the electronic device 101 may identify whether the measurement result meets the reporting criterion. Based on the reporting criterion being met, the electronic device 101 may transmit a measurement reporting message to the first base station 501 in operation 517. For example, the electronic device 101 may transmit the measurement reporting message to the first base station 501 if the met reporting criterion, e.g., the B1 event, among the above-described reporting criteria is maintained during a time-to-trigger. When the entering condition of the B1 event is met and, during the time-to-trigger, the leaving condition is not met, the electronic device 101 may determine that the reporting criterion is met. For the measurement reporting process-triggered measurement identity, the electronic device 101 may configure the measurement result (e.g., measResults of 3GPP TS 38.331 or 3GPP TS 36.331) in the measurement report message. The information element (IE) of the measurement result may include the measurement result (e.g., at least one of RSRP, RSRQ, or SINR) for intra-frequency, inter-frequency, and inter-RAT mobility. For example, the measurement reporting message may include a measurement identity and a measurement result and, in the embodiment of FIGS. 5A and 5B, the measurement identity is assumed to be associated with the second base station 502.

According to various embodiments, in operation 519, the first base station 501 may determine secondary cell group (SCG) addition for the second base station 502 based on information about the measurement reporting message. If it is determined to add an SCG, the first base station 501 may exchange an SCG addition request and an Ack with the second base station 502 in operation 521. In operation 523, the first base station 501 may transmit an RRC reconfiguration message having a configuration of SCG addition to the electronic device 101. In operation 525, the electronic device 101 may perform an RA procedure with the second base station 502 based on the configuration of SCG addition of the RRC reconfiguration message. For example, the electronic device 101 may perform at least one of transmission of an RA preamble message, reception of a random access response (RAR), transmission of an RRC connection request message, reception of an RRC connection setup message, and transmission of an RRC connection setup complete message, but the RA procedure is not limited thereto. Meanwhile, although not shown, the electronic device 101 may be configured with CA in addition to DC, so that a plurality of frequency bands according to CA may also be used. Alternatively, the electronic device 101 may perform both CA and DC to use a plurality of frequency bands.

According to various embodiments, in operation 527, the electronic device 101 may determine whether at least one low-noise amplifier is shared by a plurality of frequency bands. As described above, the electronic device 101 may identify the frequency band for communication with the second base station 502, based on frequency information (e.g., ARFCN) included in the measurement configuration or information identified in the RA procedure. The electronic device 101 may determine whether one reception RF path is shared by a plurality of frequency bands based on the frequency band for communication with the first base station 501 and the frequency band for communication with the second base station 502. For example, Table 10 is an example of a combination of an SCC, first PCC, and second PCC.

TABLE 10

B1A[4]; A[1] + B42A[4] + N78A[4]; A[1]
B1A[4]; A[1] + B42C[4,4] + N78A[4]; A[1]
B3A[4]; A[1] + B42A[4] + N78A[4]; A[1]
B3A[4]; A[1] + B42C[4,4] + N78A[4]; A[1]
B1A[4]; A[1] + B3A[4] + B42A[4] + N78A[4]; A[1]
B1A[4]; A[1] + B3A[4] + B42C[4,4] + N78A[4]; A[1]
B1A[4]; A[1] + B41A[4] + B42A[4] + N78A[4]; A[1]
B1A[4]; A[1] + B41A[4] + B42C[4,4] + N78A[4]; A[1]
B3A[4]; A[1] + B1A[4] + B42A[4] + N78A[4]; A[1]
B3A[4]; A[1] + B1A[4] + B42C[4,4] + N78A[4]; A[1]
B3A[4]; A[1] + B41A[4] + B42A[4] + N78A[4]; A[1]
B3A[4]; A[1] + B41A[4] + B42C[4,4] + N78A[4]; A[1]
B3A[4]; A[1] + B41C[4,4] + B42A[4] + N78A[4]; A[1]
B1A[2]; A[1] + B3A[4] + B41A[4] + B42A[4] + N78A[4]; A[1]
B1A[4]; A[1] + B3A[2] + B41A[4] + B42A[4] + N78A[4]; A[1]
B1A[4]; A[1] + B3A[4] + B41A[2] + B42A[4] + N78A[4]; A[1]
B1A[2]; A[1] + B3A[4] + B41A[4] + B42C[4,4] + N78A[4]; A[1]
B1A[4]; A[1] + B3A[2] + B41A[4] + B42C[4,4] + N78A[4]; A[1]
B1A[4]; A[1] + B3A[4] + B41A[2] + B42C[4,4] + N78A[4]; A[1]
B1A[2]; A[1] + B3A[4] + B41C[4,4] + B42A[4] + N78A[4]; A[1]
B1A[4]; A[1] + B3A[2] + B41C[4,4] + B42A[4] + N78A[4]; A[1]

TABLE 10-continued

B1A[4]; A[1] + B3A[4] + B41C[2,2] + B42A[4] + N78A[4]; A[1]
B1A[2]; A[1] + B3A[2] + B41C[4,4] + B42C[4,4] + N78A[4]; A[1]
B1A[4]; A[1] + B3A[4] + B41C[2,2] + B42C[4,4] + N78A[4]; A[1]
B3A[2]; A[1] + B1A[4] + B41A[4] + B42A[4] + N78A[4]; A[1]
B3A[4]; A[1] + B1A[2] + B41A[4] + B42A[4] + N78A[4]; A[1]
B3A[4]; A[1] + B1A[4] + B41A[2] + B42A[4] + N78A[4]; A[1]
B3A[2]; A[1] + B1A[4] + B41A[4] + B42C[4,4] + N78A[4]; A[1]
B3A[4]; A[1] + B1A[2] + B41A[4] + B42C[4,4] + N78A[4]; A[1]
B3A[4]; A[1] + B1A[4] + B41A[2] + B42C[4,4] + N78A[4]; A[1]
B3A[2]; A[1] + B1A[4] + B41C[4,4] + B42A[4] + N78A[4]; A[1]
B3A[4]; A[1] + B1A[2] + B41C[4,4] + B42A[4] + N78A[4]; A[1]
B3A[4]; A[1] + B1A[4] + B41C[2,2] + B42A[4] + N78A[4]; A[1]
B3A[2]; A[1] + B1A[2] + B41C[4,4] + B42C[4,4] + N78A[4]; A[1]
B3A[4]; A[1] + B1A[4] + B41C[2,2] + B42C[4,4] + N78A[4]; A[1]

In Table 10, for example, "B1A[4]; A[1]+B42A[4]+N78A [4]; A[1]" may intend that 1TX, 4RX for B1 of PCC, 4R for B42 of first SCC, and 1TX, 4RX for N78 of second SCC may be configured. "A", "B", and "C" is the carrier aggregation (CA) bandwidth class and may follow, e.g., 3GPP TS 38.101, but is not limited thereto. The underlined frequency bands in Table 10 may mean combinations capable of combining at least one piece of hardware (or RF paths). The electronic device 101 may determine that the underlined B42 band and N78 band use the hardware (or RF path) when the combination of the frequency bands shown in Table 10 is used. For example, the electronic device 101 may configure the PCC of the B2 band, the first SCC of the B48 band, and the second SCC of the N77 band and, based on the combination of the corresponding bands being included in some of the elements of Table 10, determine that at least one low-noise amplifier may be shared. Table 10 is merely an example, and a combination of frequency bands where hardware may be shared and the number of the bands in the combination are not limited. Meanwhile, a scheme for determining whether a low-noise amplifier is shared by a plurality of frequency bands is not limited.

Meanwhile, the reception strength of the signal provided from the first base station 501 may differ from the reception strength of the signal provided from the second base station 502.

For example, referring to FIG. 5B, the first base station 501 may have first coverage 581, and the second base station 502 may have second coverage 582. The electronic device 101 may measure the reception strength of the signal 591 from the first base station 501 and the reception strength of the signal 592 from the second base station 502. In the case of ex-location, since the path losses of the first base station 501 and the second base station 502 for the electronic device 101 are different, reception strengths of the signals 591 and 592 may be different. Even in the case of co-location, the reception strengths of the signals 591 and 592 may be different according to frequency characteristics and/or multipath-fading. Since the reception strengths are different, such an occasion may arise in which the optimal gain for each frequency band differs for the low-noise amplifier to be shared as described above.

For example, if, as the case where the reception strength (e.g., −35 dBm) for the B42 band and the cell power (e.g., −35 dBm) for the N78 band are substantially identical, the gains of the external low-noise amplifier for both the frequency bands are identical, it was identified that the throughput was good, and it may be identified that the block error rate (BLER) also remain low. As another example, as the cell power (e.g., −25 dBm) for the B42 band is larger than the cell power (e.g., −35 dBm) for the N78 band, the gain (e.g., G4) corresponding to the cell power (or corresponding reception strength) of the B42 band may differ from the gain (e.g., G3) corresponding to the cell power (or corresponding reception strength) of the N78 band. If a gain is set corresponding to the B42 band, it may be identified that the throughput of the N78 band of the N78 band is sharply dropped to 1% (e.g., sharply dropped from 1.6 Gbps to 10 Mbps) in simulation. This comes from the fact that amplification to G3 which is the optimized gain is required, but as the gain is set to G4, amplification is insufficient. A similar context may also occur when the cell power of the B42 band is smaller than the cell power of the N78 band. Or, if the gain of the external low-noise amplifier is set with respect to a frequency band for which the cell power (or corresponding reception strength) is relatively small, the performance of IP3, P1dB is degraded, causing a decrease in linearity, saturation of signal, and/or an increase in noise level, with the result of a drastic throughput drop. Accordingly, in a case where a plurality of frequency bands are used, when the difference in reception strength between both the RF signals is relatively small, and/or the gains corresponding to both the reception strengths are identical, a threshold level of throughput or higher may be maintained. According to various embodiments, in a case where the low-noise amplifier is shared for processing of the RF signal of the B42 band and the RF signal of the N78 band, the electronic device 101 may determine the gain of the low-noise amplifier 342 using the third association information different from the first association information and the second association information. The third association information may be information for optimization when hardware is shared for processing of a plurality of RF signals, and various examples of the third association information are described below.

Figure 6A:
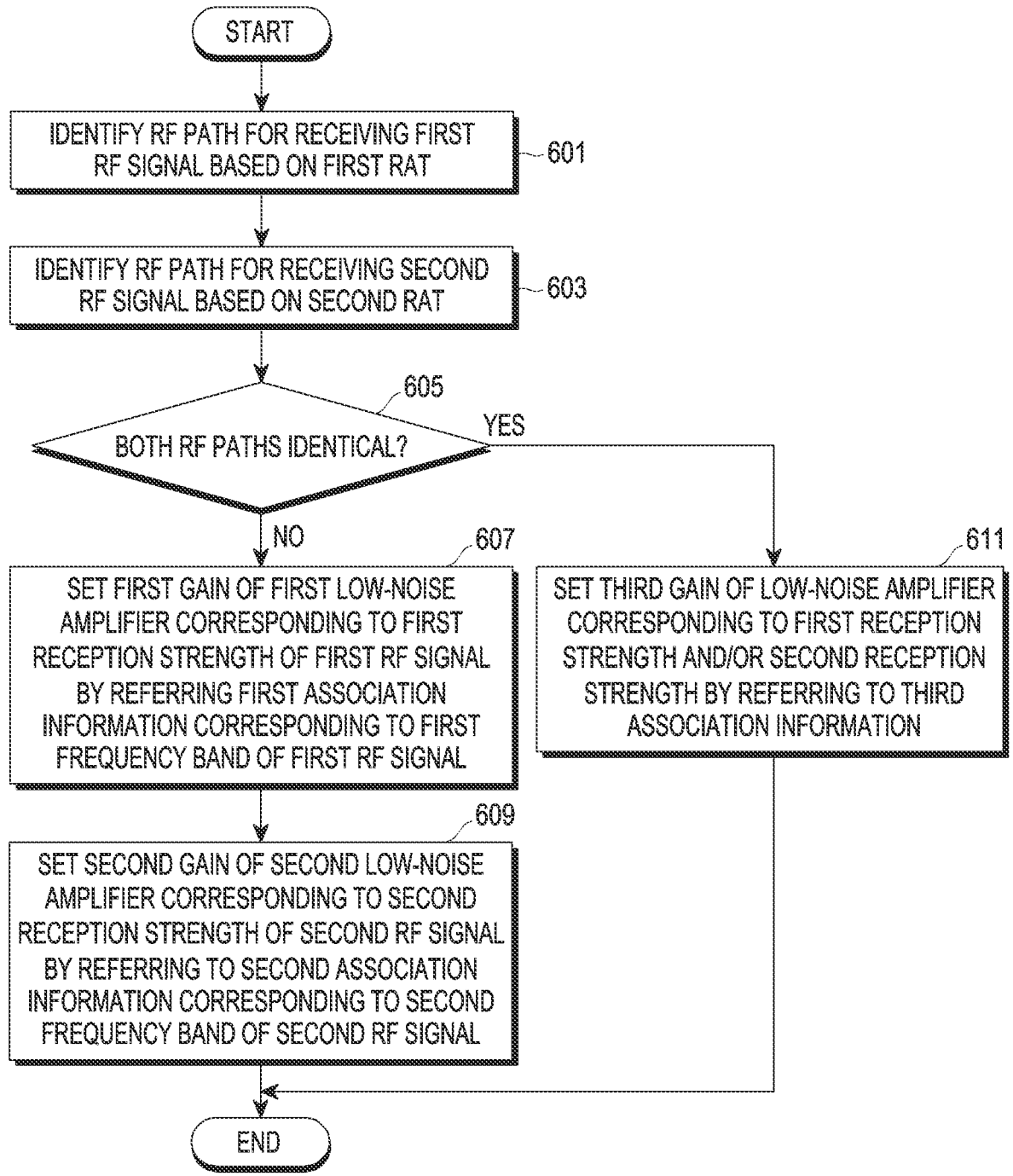
FIG. 6A is a flowchart illustrating an operation method of an electronic device according to various embodiments.

FIG. 6A is a flowchart illustrating an operation method of an electronic device according to various embodiments.

According to an embodiment, an electronic device 101 (e.g., at least one of the processor 120, the first communication processor 212, the second communication processor 214, the integrated communication processor 260, or the communication processor 301) may identify an RF path for receiving a first RF signal based on a first RAT in operation 601.

Referring to FIG. 6A, in operation 603, an RF path for receiving a second RF signal based on a second RAT may be identified. As described above, the RF path may be defined by a set of at least one piece of hardware (e.g., a switch, a filter, and at least one low-noise amplifier) for processing the RF signal output from the antenna. For example, when the RF path for receiving the first RF signal and the RF path for receiving the second RF signal are the same, the external low-noise amplifiers may be the same. Meanwhile, the electronic device 101 may be replaced and implemented to identify the external low-noise amplifier for processing the first RF signal and the external low-noise amplifier for processing the second RF signal. The electronic device 101 may determine whether both the RF paths are identical in operation 605. As described above, if the electronic device 101 is configured to identify the external low-noise amplifier for each frequency band, the electronic device 101 may determine whether the external low-noise amplifiers are identical.

According to various embodiments, if both the RF paths differ (No in 605), the electronic device 101 may set the first gain of the first low-noise amplifier corresponding to the first reception strength of the first RF signal by referring to first association information corresponding to the first frequency band of the first RF signal in operation 607. The electronic device 101 may set the second gain of the second low-noise amplifier corresponding to the second reception strength of the second RF signal by referring to second association information corresponding to the second frequency band of the second RF signal in operation 609. For example, if the first frequency band is the B3 band, and the second frequency band is the N78 band, the electronic device 101 may determine that the RF paths corresponding to both the frequency bands differ. The electronic device 101 may determine the gain of the low-noise amplifier for processing of the B3 band RF signal by referring to the association information between the reception strength set for the B3 band and the gain. The electronic device 101 may determine the gain of the low-noise amplifier for processing of the N78 band RF signal based on the association information (e.g., at least one of Tables 6 to 9) between the reception strength set for the N78 band and the gain. Since the low-noise amplifiers differ, different gains may be set for both the low-noise amplifiers.

According to various embodiments, if both the RF paths are identical (Yes in 605), the electronic device 101 may set a third gain of the low-noise amplifier corresponding to the first reception strength and/or the second reception strength by referring to the third association information at least partially different from the first association information and/or the second association information in operation 611. For example, if the first frequency band is the B42 band, and the second frequency band is the N78 band, the electronic device 101 may determine that the RF paths corresponding to both the frequency bands are identical. As described above, the first association information (e.g., at least one of Tables 2 to 5) may be configured for use of the B42 band alone and, for use of the N78 band alone, the second association information (e.g., at least one of Tables 6 to 9) may be configured. If the electronic device 101 determines that the RF paths are identical (or if the low-noise amplifier is determined to be shared), the electronic device 101 may determine the gain of the low-noise amplifier based on the third association information at least partially different from the first association information and the second association information. For example, at least some of the switching points of gain mode switching according to the third association information may differ from the switching point of gain mode switching according to the first association information and/or the switching point of gain mode switching according to the second association information. For example, the range of reception strength for a designated gain mode according to the third association information may at least partially differ from the range of reception strength for a designated gain mode according to the first association information and/or the second association information. The third association information is not limited as long as it is information at least partially different from the first association information and the second association information. Various examples of the third association information are described with reference to FIGS. 7A, 7B, and 11A to 11D. The third association information may have the same form as the first association information and the second association information (e.g., Tables 2 to 9), but is not limited thereto. For example, according to the third association information, the range of reception strength corresponding to a designated gain value may be set to be broader than the first association information and the second association information. For example, according to the third association information, the number of settable gains may be smaller than the first association information and the second association information. For example, according to the third association information, as compared with the first association information and the second association information, the switching point for the designated gain may be small. Meanwhile, the above-described characteristics of the third association information are merely an example. In the third association information, the gain corresponding to the first reception strength and the gain corresponding to the second reception strength may be set to be identical. The electronic device 101 may determine the gain corresponding to the first reception strength and/or the second reception strength based on the third association information. For example, the electronic device 101 may identify the gain corresponding to the larger of the first reception strength and the second reception strength by referring to the third association information. As another example, the electronic device 101 may identify the gain corresponding to the smaller of the first reception strength and the second reception strength by referring to the third association information. As another example, the electronic device 101 may identify the gain corresponding to both the first reception strength and the second reception strength by referring to the third association information. Meanwhile, it will be appreciated by one of ordinary skill in the art that an example of using at least some of the first reception strength and the second reception strength is not limited. Meanwhile, the electronic device 101 may additionally perform an operation for compensating for the entire gain, and this is described below.

Figure 6B:
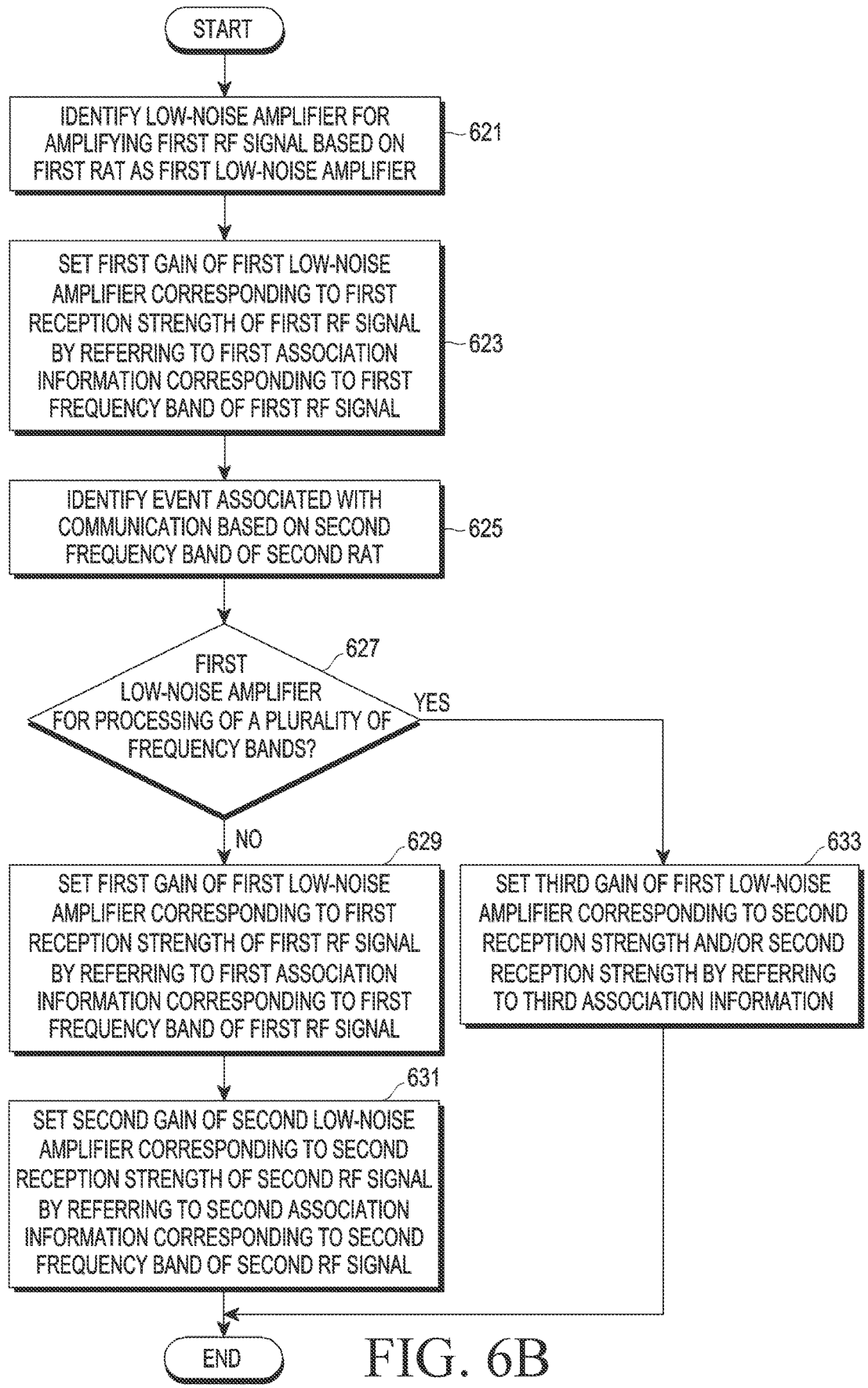
FIG. 6B is a flowchart illustrating an operation method of an electronic device according to various embodiments.

FIG. 6B is a flowchart illustrating an operation method of an electronic device according to various embodiments.

According to an embodiment, an electronic device 101 (e.g., at least one of the processor 120, the first communication processor 212, the second communication processor 214, the integrated communication processor 260, or the communication processor 301) may identify that a low-noise amplifier for amplifying a first RF signal based on a first RAT is a first low-noise amplifier in operation 621. The electronic device 101 may be in a state connected to an anchor cell (or anchor base station) based on the first RAT. The electronic device 101 may identify the first low-noise amplifier (or RF path) based on the frequency band of the anchor cell. The electronic device 101 may set the first gain of the first low-noise amplifier corresponding to the first reception strength of the first RF signal by referring to first association information corresponding to the first frequency band of the first RF signal in operation 623. For example, the electronic device 101 may refer to the first association information (e.g., at least one of Tables 2 to 5) corresponding to the first frequency band (e.g., the B42 band). The electronic device 101 may set the first gain of the first low-noise amplifier corresponding to the first reception strength of the first RF signal by referring to the first association information. Accordingly, the first low-noise amplifier of the electronic device 101 may amplify the received RF signal to the first gain and provide it to the RFIC.

According to various embodiments, in operation 625, the electronic device 101 may identify an event associated with communication based on the second frequency band of the second RAT. The event associated with communication may be at least part of at least one operation for, e.g., SCG addition. For example, the event may be at least one of reception of an RRC reconfiguration message including a measurement object (MO) of the second frequency band, measurement for the second frequency band, reporting of a measurement result for the second frequency band, reception of an RRC reconfiguration message of SCG addition configuration for the second frequency band, and performing of an RA procedure corresponding to the second frequency band, but is not limited thereto. In operation 627, the electronic device 101 may determine whether the first low-noise amplifier (or RF path) is shared for processing of a plurality of frequency bands. For example, the electronic device 101 may previously store information about at least one low-noise amplifier (or RF path) for processing the first frequency band and at least one low-noise amplifier (or RF path) for processing the second frequency band. The electronic device 101 may identify at least one low-noise amplifier (or RF path) for processing the second frequency band and determine whether there is a low-noise amplifier identical to the first low-noise amplifier using a result of the identification. Or, the electronic device 101 may store information about a combination of frequency bands sharing the low-noise amplifier (or sharing the RF path) as described in connection with Table 10. The electronic device 101 may determine whether the first low-noise amplifier (or RF path) is shared for processing of a plurality of frequency bands by determining whether the first frequency band and the second frequency band are included in a stored combination.

According to various embodiments, if the first low-noise amplifier (or RF path) is not shared for processing the plurality of frequency bands (No in 627), the electronic device 101 may set the first gain of the first low-noise amplifier corresponding to the first reception strength of the first RF signal by referring to first association information corresponding to the first frequency band of the first RF signal in operation 629. For example, the reception strength of the first RF signal may be changed before and after an event occurs. Accordingly, if the same first association information is referenced, the gain may be changed or maintained. However, the first association information which is a reference target may be maintained when the first low-noise amplifier is not shared by processing of the plurality of frequency bands. In operation 631, the electronic device 101 may set the second gain of the second low-noise amplifier corresponding to the second reception strength of the second RF signal by referring to the second association information corresponding to the second frequency band of the second RF signal. The second association information may be association information between the reception strength for the second frequency band and the gain of the external low-noise amplifier. The second association information may be association information corresponding to when the external low-noise amplifier is not shared by the plurality of frequency bands.

According to various embodiments, if the first low-noise amplifier (or RF path) is shared for processing of the plurality of frequency bands (Yes in 627), the electronic device 101 may set the third gain of the first low-noise amplifier corresponding to the first reception strength and/or the second reception strength by referring to the third association information in operation 633. If the electronic device 101 performs SCG addition for the second frequency band of the N78 band, the electronic device 101 may refer to third association information different from the first association information (e.g., at least one of Tables 2 to 5) and the second association information (e.g., at least one of Tables 6 to 9). The third association information may be substantially identical to the third association information described in connection with FIG. 6A, and various examples are described below.

Figure 6C:
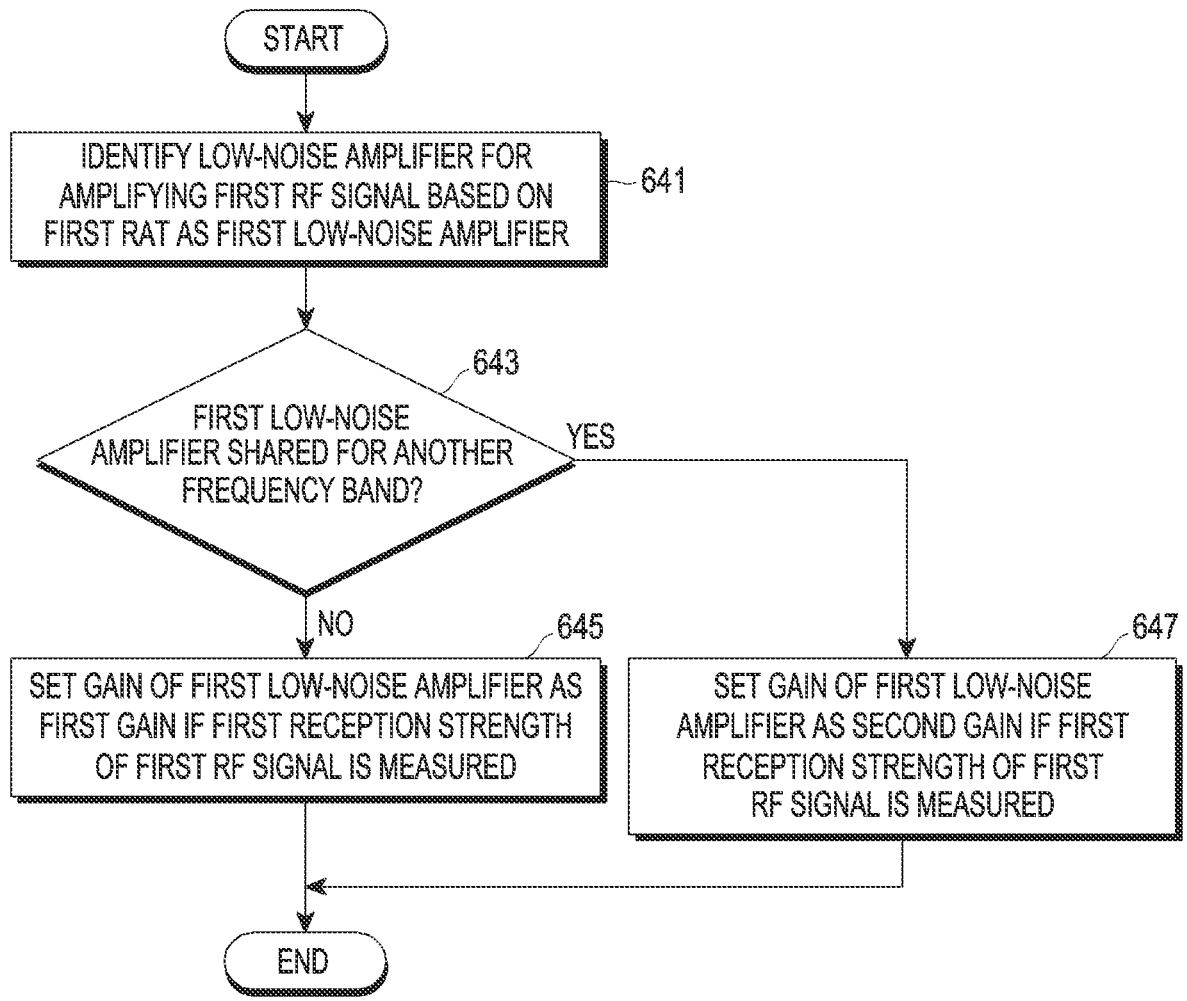
FIG. 6C is a flowchart illustrating an operation method of an electronic device according to various embodiments.

FIG. 6C is a flowchart illustrating an operation method of an electronic device according to various embodiments.

According to an embodiment, an electronic device 101 (e.g., at least one of the processor 120, the first communication processor 212, the second communication processor 214, the integrated communication processor 260, or the communication processor 301) may identify that a low-noise amplifier for amplifying a first RF signal based on a first RAT is a first low-noise amplifier in operation 641. As described above, the electronic device 101 may identify the first low-noise amplifier (or RF path) based on the frequency band of the first RAT. In operation 643, the electronic device 101 may determine whether the first low-noise amplifier is shared by another frequency band. A configuration for determining whether a low-noise amplifier is shared has been described above, and no further detailed description thereof is given below.

In a case where the first low-noise amplifier is not shared by another frequency band (No in 643), if the first reception strength of the first RF signal is measured, the electronic device 101 may set the gain of the first low-noise amplifier to a first gain in operation 645. In a case where the first low-noise amplifier is shared by another frequency band (Yes in 643), if the first reception strength of the first RF signal is measured, the electronic device 101 may set the gain of the first low-noise amplifier to a second gain in operation 647. In one example, even when the reception strengths of the RF signals are identical, the gains may be set to differ depending on whether the designated low-noise amplifier is shared by the plurality of frequency bands. In the designated reception strength, the gain corresponding to the first association information may be identical to, or different from, the gain transmission the third association information, which is described with reference to FIGS. 7A and 7B.

Figure 7A:
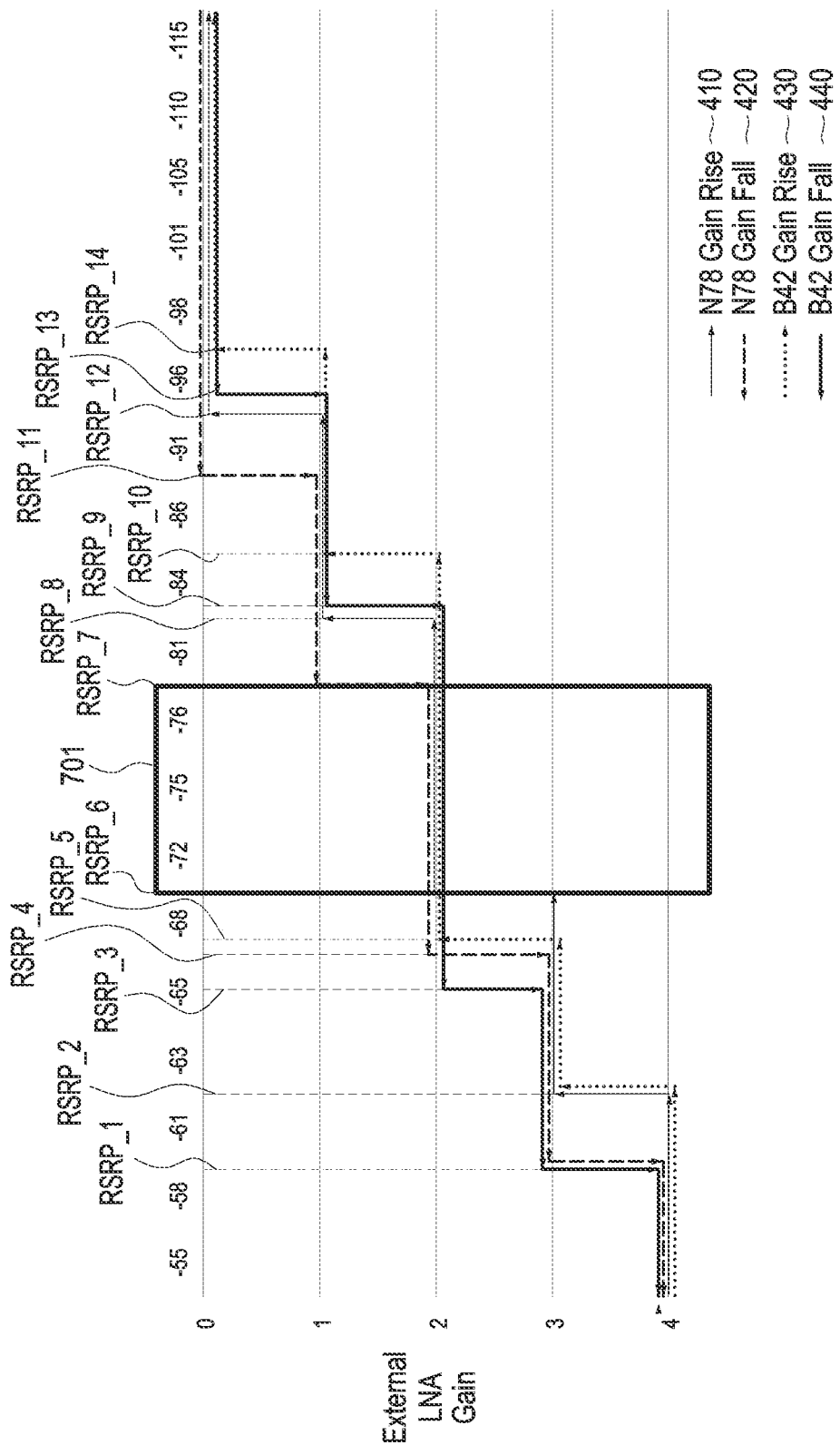
FIGS. 7A and 7B are views illustrating association information between reception strength and gain of an external low-noise amplifier according to various embodiments.
Figure 7B:
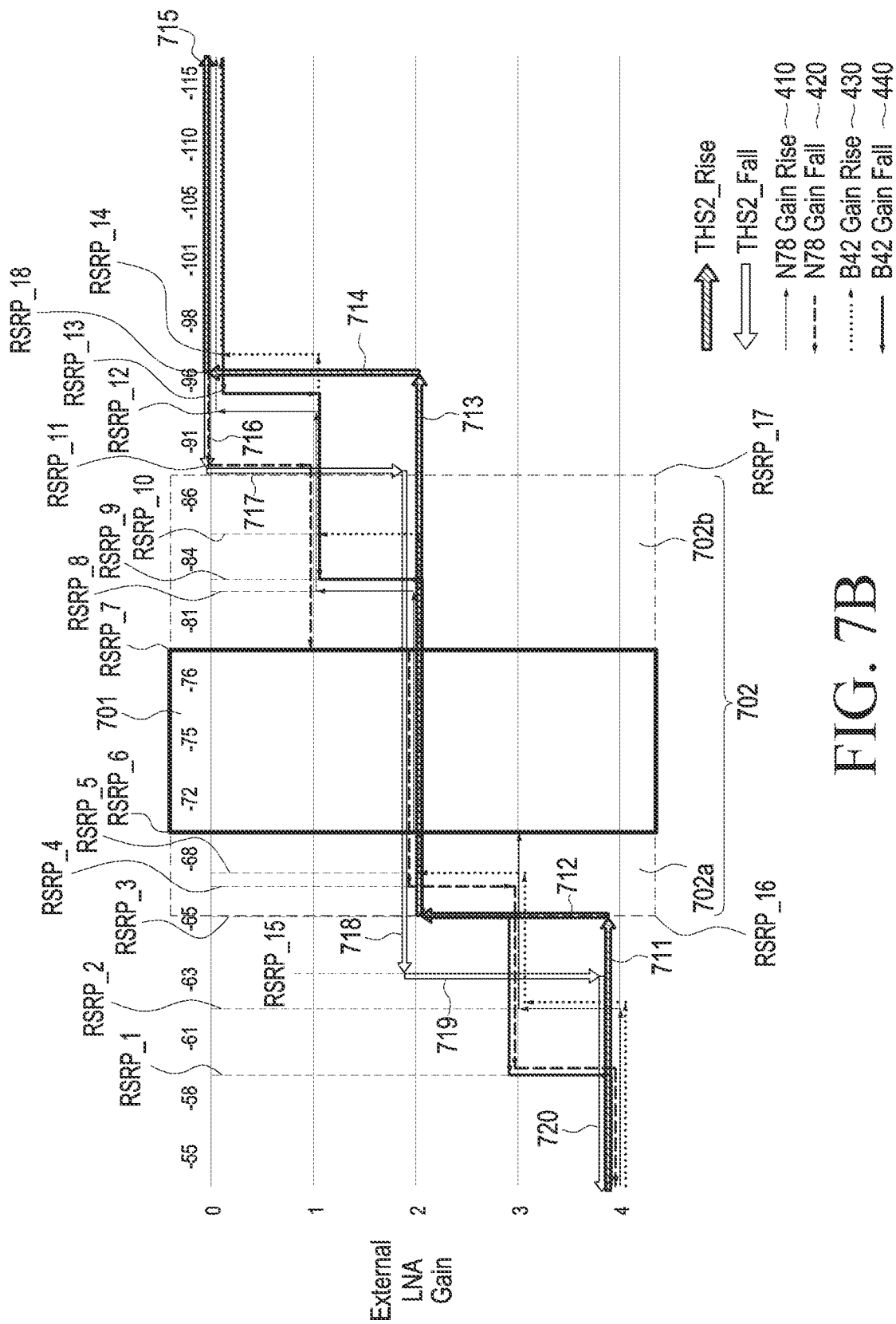

FIGS. 7A and 7B are views illustrating association information between reception strength and gain of an external low-noise amplifier according to various embodiments.

FIG. 7A shows association information 410 and 420 between the range of reception strength for the N78 band and the gain of the external low-noise amplifier and association information 430 and 440 between the range of reception strength for the B42 band and the gain of the external low-noise amplifier, when a low-noise amplifier is not shared as described in connection with FIG. 4.

Referring to FIG. 7A, in a first reception strength range 701 of RSRP_6 to RSRP_7, the gain of the external low-noise amplifier may be set to G2. For example, if the first reception strength range 701 of RSRP_6 to RSRP_7 is measured for both when the gain in the N78 band increases and when the gain decreases, the gain corresponding to the N78 band may be set to G2. For example, if the first reception strength range 701 of RSRP_6 to RSRP_7 is measured for both when the gain in the B42 band increases and when the gain decreases, the gain corresponding to the B42 band may be set to G2. The electronic device 101 may set the gain of the external low-noise amplifier shared by the B42 band and the N78 band to G2. Since the optimized gain has been set for both the B42 band and the N78 band, a possibility that the throughput for the designated frequency band is to drop is small in the first reception strength range 701. The first reception strength range 701 may be referred to as a guaranteed area in the sense that a predetermined level of throughput may be guaranteed.

FIG. 7B shows third related information 711, 712, 713, 714, 715, 716, 717, 718, 719, and 720 according to various embodiments. In the third related information 711, 712, 713, 714, 715, 716, 717, 718, 719, and 720, a threshold having a hysteresis characteristic for an increase and decrease in the gain of the low-noise amplifier may be set. For example, association information 711, 712, 713, 714, and 715 between the reception strength and the increase in the gain of the external low-noise amplifier may be set. When the reception strength of the RF signal of an arbitrary frequency band exceeds RSRP_16, association information 711 in which the gain of G4 is maintained may be stored in the electronic device 101. When the reception strength of the RF signal of an arbitrary frequency band is RSRP_16, association information 712 in which the gain of G4 is increased to G2 may be stored in the electronic device 101. When the reception strength of the RF signal of an arbitrary frequency band exceeds RSRP_17 and is RSRP_16 or less, association information 713 in which the gain of G2 is maintained may be stored in the electronic device 101. When the reception strength of the RF signal of an arbitrary frequency band is RSRP_18, association information 714 in which the gain of G2 is increased to G0 may be stored in the electronic device 101. When the reception strength of the RF signal of an arbitrary frequency band exceeds RSRP_18, association information 715 in which the gain of G0 is maintained may be stored in the electronic device 101. For example, association information 716, 717, 718, 719, and 720 between the reception strength and the decrease in the gain of the external low-noise amplifier may be set. When the reception strength of the RF signal of an arbitrary frequency band is less than RSRP_17, association information 716 in which the gain of G0 is maintained may be stored in the electronic device 101. When the reception strength of the RF signal of an arbitrary frequency band is RSRP_17, association information 717 in which the gain of G0 is decreased to G2 may be stored in the electronic device 101. When the reception strength of the RF signal of an arbitrary frequency band is RSRP_17 or more and is less than RSRP_15, association information 718 in which the gain of G2 is maintained may be stored in the electronic device 101. When the reception strength of the RF signal of an arbitrary frequency band is RSRP_15, association information 719 in which the gain of G2 is decreased to G4 may be stored in the electronic device 101. When the reception strength of the RF signal of an arbitrary frequency band is RSRP_15 or more, association information 720 in which the gain of G4 is maintained may be stored in the electronic device 101. As described above, thresholds may be set to have hysteresis characteristics for an increase and decrease in gain.

In the above-described example, the electronic device 101 may store association information when the gain is increased between the range of reception strength when the low-noise amplifier is shared as shown in Table 11 and the gain of the external low-noise amplifier.

TABLE 11

| Reception strength (RSRP) | more than RSRP_16 | more than RSRP_18 RSRP_16 or less | RSRP_18 or less |
|---|---|---|---|
| External low-noise amplifier gain (mode) | G4 | G2 | G0 |

In the above-described example, the electronic device 101 may store association information when the gain is decreased between the range of reception strength when the low-noise amplifier is shared as shown in Table 12 and the gain of the external low-noise amplifier.

TABLE 12

| Reception strength (RSRP) | RSRP_17 or less | more than RSRP_17 RSRP_15 or more | more than RSRP_15 |
|---|---|---|---|
| External low-noise amplifier gain (mode) | G0 | G2 | G4 |

As shown in Tables 11 and 12, the electronic device 101 may set three step gains of G4, G2, and G0 as the third association information.

Or, the electronic device 101 may store information about the threshold for changing the gain as shown in Tables 13 and 14, but this may also be an example of association information between reception strength and the gain of the low-noise amplifier. Table 13 may be information about the threshold when the gain increases, and Table 14 may be information about the threshold when the gain decreases.

TABLE 13

| Reception strength (RSRP) | RSRP_16 | RSRP_18 |
|---|---|---|
| change of external low-noise amplifier gain (mode) | G4 ⇒ G2 | G2 ⇒ G0 |

TABLE 14

| Reception strength (RSRP) | RSRP_17 | RSRP_15 |
|---|---|---|
| change of external low-noise amplifier gain (mode) | G0 ⇒ G2 | G2 ⇒ G4 |

The thresholds of reception strength in Tables 13 and 14 may be referred to as switching points. Meanwhile, in another example, the electronic device 101 may be implemented to include association information including a value for a hysteresis characteristic and/or variation in reception strength required for a gain switch with respect to the prior gain-switched reception strength, and the form of implementing association information is not limited.

In one example, according to the third association information (e.g., at least one of Tables 11 to 14), the range of the reception strength corresponding to the specific gain value may be set to be wide as compared with the first association information (e.g., at least one of Tables 2 to 5) and the association information (at least one of Tables 6 to 9).

For example, referring to FIG. 7B, the gain of G2 may be maintained in the second reception strength range 702 between RSRP_16 to RSRP_17. The second reception strength range 702 may be set wider than the first reception strength range 701 of FIG. 7A in which the gain of G2 is maintained. However, that the reception strength range corresponding to the specific gain value of the third association information is set to be wider than the first association information and/or the second association information is an example, but is not limited.

In one example, according to the third association information (e.g., at least one of Tables 11 to 14), the number of settable gains may be small as compared with the first association information (e.g., at least one of Tables 2 to 5) and the association information (at least one of Tables 6 to 9). For example, in the third association information about FIG. 7B, three gains of G0, G2, and G4 may be set, and the number thereof may be smaller than the number of, i.e., five, gains of G0, G1, G2, G3, and G4 in FIG. 7A. Meanwhile, it is merely exemplary that the number of settable gains in the third association information is different from that in the first association information and/or the second association information, and they may be set to be identical. The number of gains settable in the third association information may be larger than that in the first association information and/or the second association information.

According to various embodiments, if at least one low-noise amplifier is determined to be shared by a plurality of frequency bands, the electronic device 101 may determine the gain corresponding to the reception strength using the third association information (e.g., at least one of Tables 11 to 14). Meanwhile, the electronic device 101 may use the third association information when the gain of the first frequency band based on the third association information is identical to the gain of the second frequency band based on the third association information. If the gain for each frequency band identified based on the third association information differs, the electronic device 101 may use other association information, which is described below. The electronic device 101 may perform an additional operation (e.g., adjusting the bias of the low-noise amplifier and/or adjusting the gain of the RFIC) to compensate for the entire gain, which is described below.

For example, it may be determined that the RF signal of the N78 band alone is amplified by a specific low-noise amplifier. If the reception strength increases from a value less than RSRP_4 to RSRP_4, the second association information (e.g., at least one of Tables 5 to 9) for the N78 band is used so that the gain may be reduced from G2 to G3 as described in connection with FIG. 4. Meanwhile, it may be determined that the RF signal of the B42 band and the RF signal of the N78 band share the specific low-noise amplifier. The third association information (e.g., at least one of Tables 11 to 14) may be used. As described in connection with FIG. 7B, if the reception strength increases from a value less than RSRP_4 to RSRP_4, the gain may be maintained as G2 based on the association information 718. As in the association information 719, the gain may be changed from G2 to G0 in the reception strength of RSRP_15. As described above, depending on whether the specific low-noise amplifier is used by a single frequency band or by a plurality of frequency bands, the reception intensity at which the gain is switched may be different.

In various embodiments, the electronic device 101 may be configured to use the third association information in a case where the reception strength (e.g., the first reception strength and/or the second reception strength) is included in the reception strength range corresponding to G2 (e.g., the second reception strength range 702 of RSRP_16 to RSRP_17).

In various embodiments, the electronic device 101 may perform an additional operation (e.g., adjusting the bias of the external low-noise amplifier and/operation restriction adjusting the gain of the RFIC (internal low-noise amplifier and/or ABB amplifier)) to compensate for the entire gain. For example, in a case where the reception strength is included in a first partial region 702a of FIG. 7B, the electronic device 101 may compensate for the entire gain by reducing the gain of the RFIC. For example, in a case where the reception strength is included in a second partial region 702b of FIG. 7B, the electronic device 101 may compensate for the entire gain by increasing the gain of the RFIC. The adjustment of the bias of the external low-noise amplifier and/or the adjustment of the gain of the RFIC (internal low-noise amplifier and/or ABB amplifier) may be configured considering only compensation for the entire gain or, according to an implementation, it may be configured considering compensation for the entire gain and the entire NF. For example, the entire gain of N amplifiers may be the sum of the respective gains of the amplifiers. For example, in a case where the RF signal is processed by N amplifiers, the entire NF may be set according to Equation 1.

$$F = F_1 + \frac{F_2 - 1}{G_1} + \frac{F_3 - 1}{G_1 G_3} + \ldots + \frac{F_2 - 1}{G_1} + \frac{F_N - 1}{G_1 G_2 \ldots G_{N-1}} \quad \text{Equation 1}$$

In Equation 1, F may be the entire NF according to all of the N amplifiers. Fi may be the NF of the ith amplifier. $G_i$ may be the gain of the ith amplifier. As the third association information is referenced, the gain and/or NF of the low-noise amplifier may be changed as compared to a case in which the first association information and/or the second association information is referenced. The electronic device 101 may adjust the gain of the other amplifiers (e.g., the internal low-noise amplifier and/or ABB amplifier in the RFIC) than the low-noise amplifier so that the entire gain when the third association information is referenced has a value identical to the entire gain when the first association information and/or the second association information is referenced (or a value with a difference less than a threshold). The electronic device 101 may adjust the gain and/or NF of the other amplifiers (e.g., the internal low-noise amplifier in the RFIC and/or ABB amplifier) than the low-noise amplifier so that the entire NF when the third association information is referenced has a value identical to the entire gain when the first association information and/or the second association information is referenced (or a value with a difference less than a threshold).

Figure 8B:
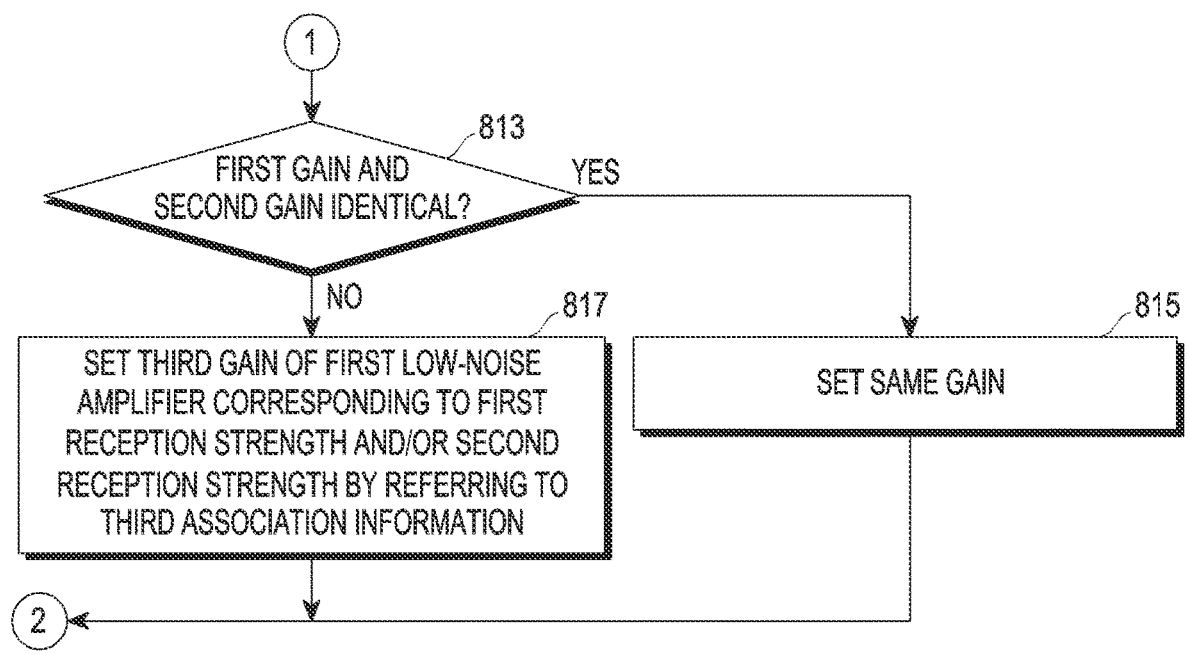

FIGS. 8A and 8B are flowcharts illustrating an operation method of an electronic device according to various embodiments.

Referring to FIG. 8A, an electronic device 101 (e.g., at least one of the processor 120, the first communication processor 212, the second communication processor 214, the integrated communication processor 260, or the communication processor 301) may identify that a low-noise amplifier for amplifying a first RF signal based on a first RAT is a first low-noise amplifier in operation 801. As described above, the electronic device 101 may identify the first low-noise amplifier based on the first frequency band of the first RAT. In operation 803, the electronic device 101 may set the first gain of the first low-noise amplifier corresponding to the first reception strength of the first RF signal by referring to the first association information corresponding to the first frequency band of the first RF signal. In operation 805, the electronic device 101 may identify an event associated with communication based on the second frequency band of the second RAT. The event may include at least some of at least one operation for SCG addition as described above, but is not limited thereto. Based on identifying the event, the electronic device 101 may determine whether the first low-noise amplifier is shared for processing of a plurality of frequency bands in operation 807. As described above, the electronic device 101 may identify the second frequency band identified while performing at least one operation for SCG addition. For example, the electronic device 101 may identify the low-noise amplifier based on the second frequency band. The electronic device 101 may determine whether the identified low-noise amplifier corresponding to the second frequency band is at least partially identical to the low-noise amplifier corresponding to the first frequency band. If the first low-noise amplifier is not shared for processing the plurality of frequency bands (No in 807), the electronic device 101 may set the first gain of the first low-noise amplifier corresponding to the first reception strength of the first RF signal by referring to first association information corresponding to the first frequency band of the first RF signal in operation 809. The electronic device 101 may set the second gain of the second low-noise amplifier corresponding to the second reception strength of the second RF signal by referring to second association information corresponding to the second frequency band of the second RF signal in operation 811. Since the first frequency band and the second frequency band do not share the low-noise amplifier, the electronic device 101 may set the gain of the low-noise amplifier corresponding to the first frequency band based on the reception strength of the first RF signal and independently set the gain of the low-noise amplifier corresponding to the second frequency band based on the reception strength of the second RF signal.

If the first low-noise amplifier is shared for processing of the plurality of frequency bands (Yes in 807), according to various embodiments, the electronic device 101 may determine whether the first gain corresponding to the first reception strength identified based on the first association information is identical to the second gain corresponding to the second reception strength identified based on the second association information in operation 813. If the first gain and the second gain are identical (Yes in 813), the electronic device 101 may set the gain of the low-noise amplifier as the same gain in operation 815. If the first gain and the second gain are not identical (No in 813), the electronic device 101 may set the third gain of the first low-noise amplifier corresponding to the first reception strength and/or the second reception strength by referring to the third association information in operation 817.

Figure 9:
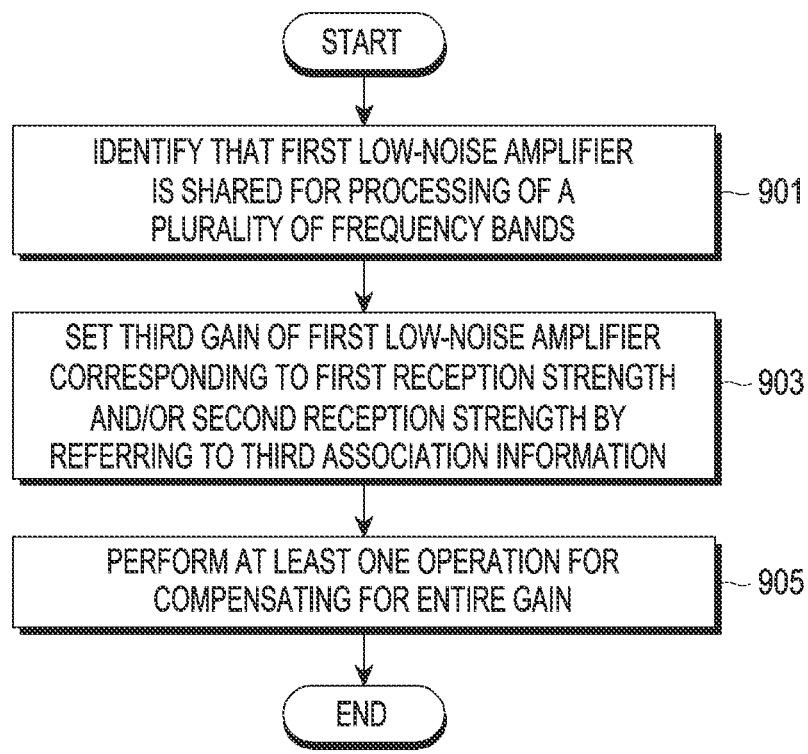
FIG. 9 is a flowchart illustrating an operation method of an electronic device according to various embodiments.

FIG. 9 is a flowchart illustrating an operation method of an electronic device according to various embodiments.

According to an embodiment, an electronic device 101 (e.g., at least one of the processor 120, the first communication processor 212, the second communication processor 214, the integrated communication processor 260, or the communication processor 301) may identify that the first low-noise amplifier is shared for processing of a plurality of frequency bands in operation 901. A method for determining whether at least one low-noise amplifier is shared for processing a plurality of frequency bands has been described above, and no further detailed description thereof is given. In operation 903, the electronic device 101 may set the third gain of the first low-noise amplifier corresponding to the first reception strength and/or the second reception strength by referring to the third association information based on sharing by the plurality of frequency bands. In operation 905, the electronic device 101 may perform at least one operation for compensating for the entire gain. For example, the entire gain in the process of reception may be determined as the gain of the external low-noise amplifier, the gain of the low-noise amplifier in the RFIC, and/or the gain of the ABB amplifier. Among them, the gain of the external low-noise amplifier using the third association information differs from the gain based on the optimized first association information, it may also affect the entire gain. The electronic device 101 may adjust the RFIC gain (e.g., the gain of the low-noise amplifier in the RFIC and/or the gain of the ABB amplifier) so that the entire gain based on the first association information is maintained (or has a value close to the entire gain) although the third association information is used. For example, if the gain identified based on the first association information is larger than the gain identified based on the third association information, the electronic device 101 may compensate for the entire gain by reducing the RFIC gain. For example, if the gain identified based on the third association information is smaller than the gain identified based on the first association information, the electronic device 101 may compensate for the entire gain by increasing the RFIC gain. For example, the first association information, the second association information, and the third association information may further include information about the gain of the internal low-noise amplifier in addition to the information about the gain of the external low-noise amplifier for each reception strength. Table 15 is an example of association information (e.g., the first association information) when the RF path is used by a single frequency band (e.g., the B42 band). Table 16 is an example of association information (e.g., the third association information) when the RF path is used by a plurality of frequency bands (e.g., the B42 band and the N78 band).

TABLE 15

| Cell power (dBm) | RSRP (dBm) | AGC log (RFIC) | internal gain value (dB) | external LNA gain mode | external gain value (dB) | external LNA bias mode | entire gain (dB) |
|---|---|---|---|---|---|---|---|
| −20 | −55 | 8 | 12 | G4 | −4.2 | 3 | 7.8 |
| −23 | −58 | 7 | 17 | | | | 12.8 |
| −25 | −61 | | | | | | |
| −27 | −63 | | | G3 | −3.1 | | |
| −30 | −65 | | | | | | 13.9 |
| −32 | −68 | 6 | 20 | | | | 16.9 |
| −35 | −72 | 5 | 23 | G2 | 11.9 | | 19.9 |
| −38 | −75 | 4 | 26 | | | | 37.9 |
| −40 | −76 | 3 | 29 | | | | 40.9 |
| −45 | −81 | 2 | 32 | | | | 43.9 |
| −48 | −84 | | | G1 | 16.4 | | |
| −50 | −86 | | | | | | 48.4 |
| −55 | −91 | 1 | 35 | | | | 51.4 |
| −60 | −96 | | | G0 | 19 | | |
| −62 | −98 | 0 | 43 | | | | 54 |
| −65 | −101 | | | | | | 62 |
| −70 | −105 | | | | | | |
| −75 | −110 | | | | | | |
| −85 | −115 | | | | | | |
| −90 | −120 | | | | | | |

TABLE 16

| Cell power (dBm) | RSRP (dBm) | AGC log (RFIC) | internal gain value (dB) | external LNA gain mode | external gain value (dB) | external LNA bias mode | entire gain (dB) |
|---|---|---|---|---|---|---|---|
| −20 | −55 | 8 | 12 | G4 | −4.2 | 3 | 7.8 |
| −23 | −58 | 7 | 17 | | | | 12.8 |
| −25 | −61 | | | | | | |
| −27 | −63 | | | | | | |
| −30 | −65 | 6 | 20 | | | | 15.8 |
| −32 | −68 | 5 | 23 | G2 | 11.9 | | 34.9 |
| −35 | −72 | 4 | 26 | | | | 37.9 |
| −38 | −75 | | | | | | 37.9 |
| −40 | −76 | 3 | 29 | | | | 40.9 |
| −45 | −81 | 2 | 32 | | | | 43.9 |
| −48 | −84 | | | | | | |
| −50 | −86 | 1 | 35 | | | | 46.9 |
| −55 | −91 | | | | | | |
| −60 | −96 | | | G0 | 19 | | 54 |
| −62 | −98 | | | | | | |
| −65 | −101 | 0 | 43 | | | | 62 |
| −70 | −105 | | | | | | |
| −75 | −110 | | | | | | |
| −85 | −115 | | | | | | |
| −90 | −120 | | | | | | |

Automatic gain control (AGC) log in Tables 15 and 16 may mean the RFIC internal gain mode, and it may correspond to the internal gain value. For example, when AGC log is 8, it may mean that the internal gain is 12 dB. The external LNA bias mode may mean the bias applied to the external low-noise amplifier. The entire gain may mean the gain of the entire RF path for reception. In Table 16, it may be identified that three gains G0, G2, and G4 are set as described above with reference to FIG. 7B.

For example, it is assumed that RSRP is −86 dBm. When the first association information as shown in Table 15 is referenced (e.g., when the RF signal of the B42 band is processed by the RF path alone), the external LNA gain mode corresponding to −86 dBm may be G1, e.g., the gain value may be 16.4 dB. Further, the internal gain value corresponding to −86 dBm in Table 15 may be 32 dB. Accordingly, the entire gain may be 48.4 dB. When the third association information as shown in Table 16 is referenced (e.g., when the RF signal of the B42 band and the RF signal of the N78 band are processed together in the RF path), the external LNA gain mode corresponding to −86 dBm may be G2, e.g., the gain value may be 11.9 dB. Further, the internal gain value corresponding to −86 dBm in Table 16 may be 35 dB and may differ from the internal gain value, 32 dB, corresponding to −86 dBm in Table 15. Accordingly, the entire gain may be 46.9 dB and may have a difference of 1.5 dB from the entire gain, 48.4 dB in Table 15. However, if the gain, 35 dB of the RFIC in Table 16 were maintained as 32 dB as shown in Table 15, the entire gain in Table 16 would have been 49.9 dB and it would have had a difference of 4.5 dB from the entire gain, 48.4 dB, in Table 15. As described above, if association information in which the guaranteed area for the external low-noise amplifier as shown in Table 16 is expanded, it is possible to compensate for the entire gain by adjusting the gain of the RFIC as well. Meanwhile, in Table 15 and 16, the bias of the external low-noise amplifier is maintained as "3," but this is exemplary. The bias of the external low-noise amplifier may also be set to differ between Table 15 and 16.

Figure 10:
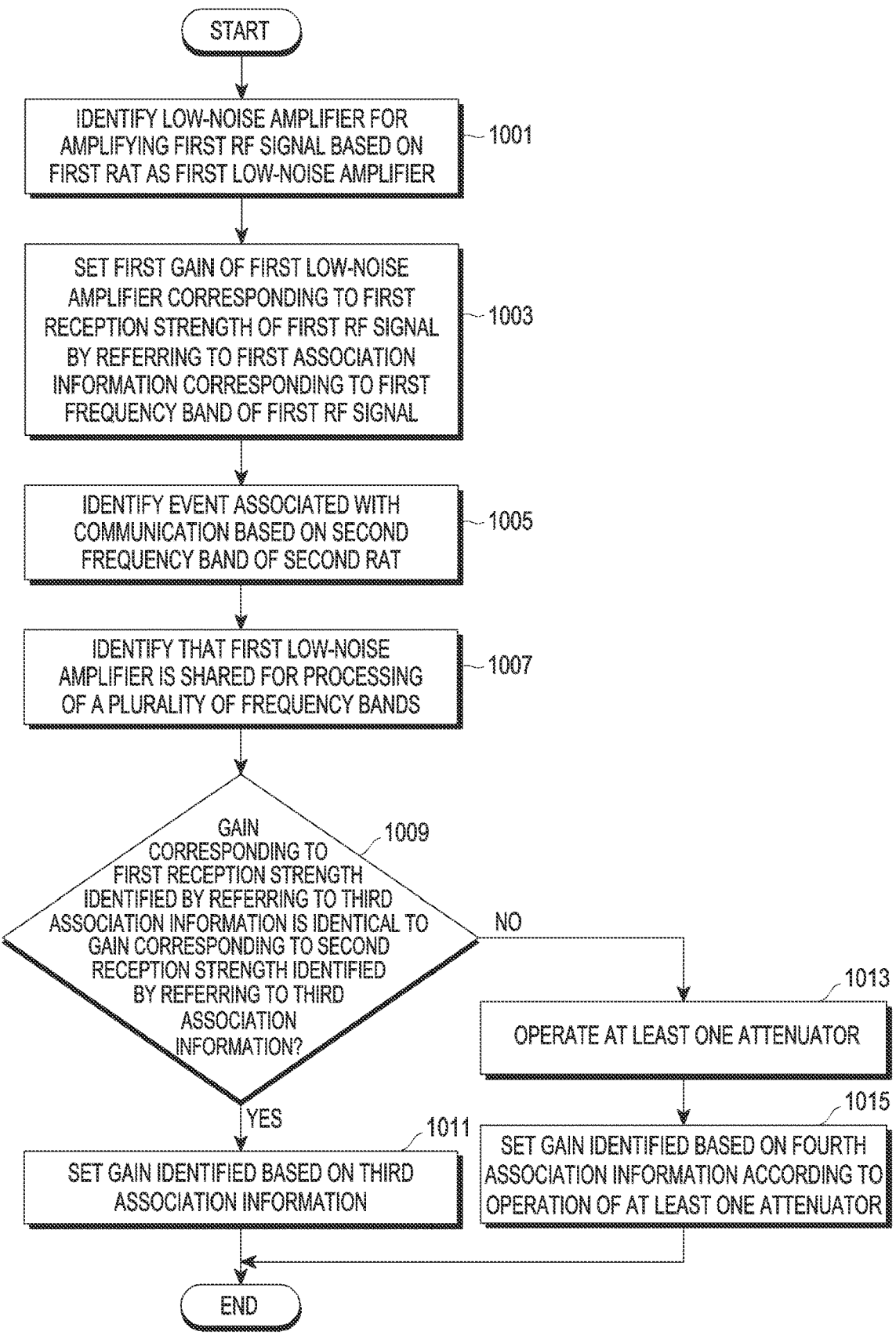
FIG. 10 is a flowchart illustrating an operation method of an electronic device according to various embodiments.

FIG. 10 is a flowchart illustrating an operation method of an electronic device according to various embodiments. The embodiment of FIG. 10 is described with reference to FIGS. 11A to 11D.

FIGS. 11A, 11B, 11C, and 11D are views illustrating association information between reception strength and gain of an external low-noise amplifier according to various embodiments.

Referring to FIG. 10, according to an embodiment, an electronic device 101 (e.g., at least one of the processor 120, the first communication processor 212, the second communication processor 214, the integrated communication processor 260, or the communication processor 301) may identify that a low-noise amplifier for amplifying a first RF signal based on a first RAT is a first low-noise amplifier in operation 1001. As described above, the electronic device 101 may identify a low-noise amplifier for amplifying the first RF signal based on the first frequency band of the first RAT. The electronic device 101 may set the first gain of the first low-noise amplifier corresponding to the first reception strength of the first RF signal by referring to first association information corresponding to the first frequency band of the first RF signal in operation 1003. In operation 1005, the electronic device 101 may identify an event associated with communication based on the second frequency band of the second RAT. The event may include at least some of at least one operation for SCG addition as described above, but is not limited thereto. Based on identifying the event, the electronic device 101 may determine that the first low-noise amplifier is shared for processing of a plurality of frequency bands in operation 1007. As described above, the electronic device 101 may identify the second frequency band identified while performing at least one operation for SCG addition. For example, the electronic device 101 may identify the low-noise amplifier based on the second frequency band. The electronic device 101 may determine whether the identified low-noise amplifier corresponding to the second frequency band is at least partially identical to the low-noise amplifier corresponding to the first frequency band.

According to various embodiments, in operation 1009, the electronic device 101 may determine whether the gain corresponding to the first reception strength identified by referring to the third association information and the gain corresponding to the second reception strength identified by referring to the third association information are identical to each other. If the gain corresponding to the first reception strength is identical to the gain corresponding to the second reception strength (Yes in 1009), the electronic device 101 may set the gain identified based on the third association information as the gain of the external low-noise amplifier in operation 1011. If the gain corresponding to the first reception strength differs from the gain corresponding to the second reception strength (No in 1009), the electronic device 101 may operate at least one attenuator in operation 1013. In operation 1015, the electronic device 101 may set the gain identified based on the fourth association information based on the operation of at least one attenuator.

Figure 11A:
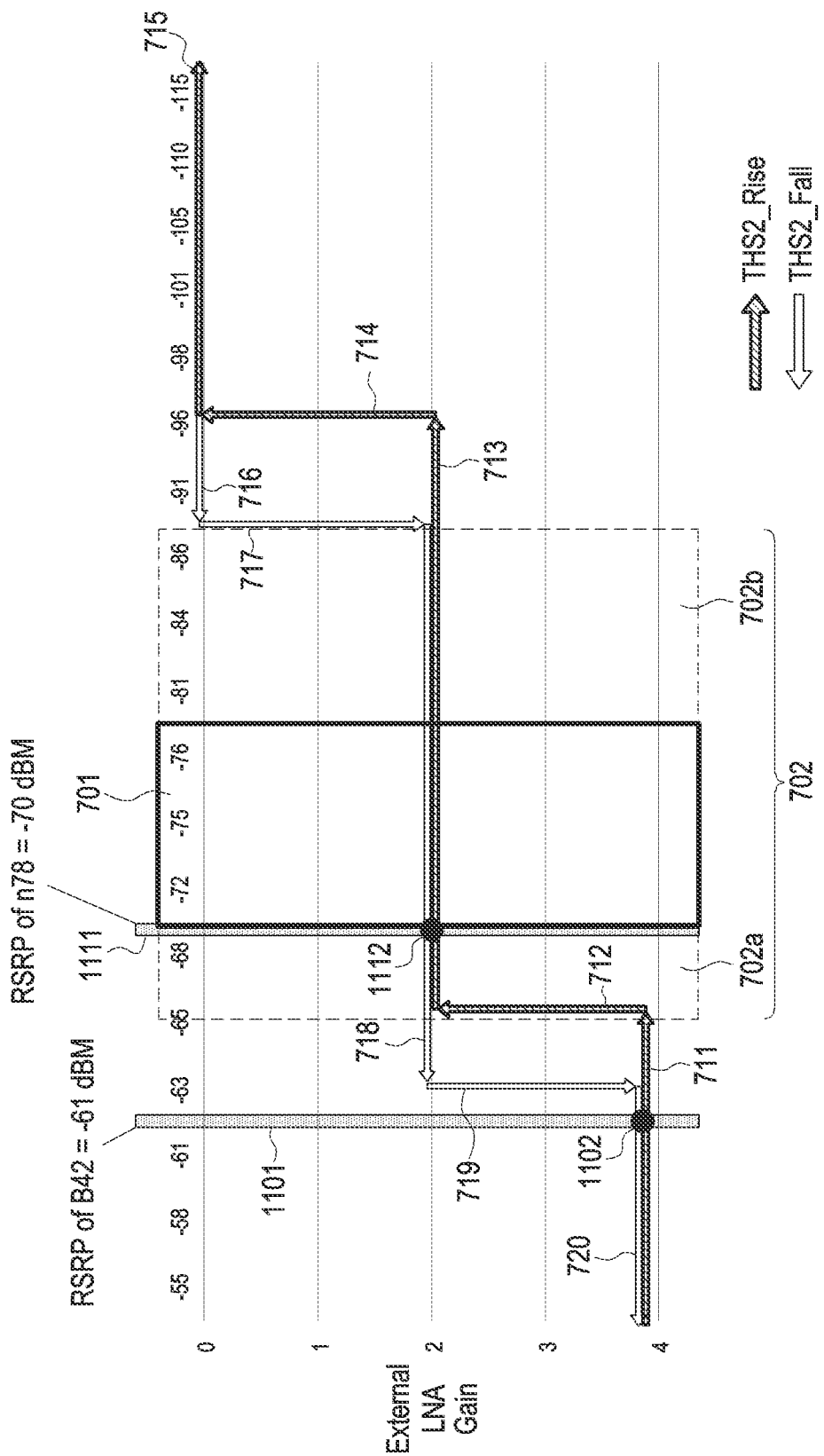
FIGS. 11A, 11B, 11C, and 11D are views illustrating association information between reception strength and gain of an external low-noise amplifier according to various embodiments.

For example, FIG. 11A illustrates the third association information 711 to 720 described in connection with FIG. 7B. For example, it is assumed that the electronic device 101 identifies the first reception strength 1101 of −61 dBm for the B42 band and the second reception strength 1111 of −70 dBm for the N78 band. The first gain 1102 corresponding to the first reception strength 1101 of −61 dBm may be G4, and the second gain 1112 corresponding to the second reception strength 1111 of −70 dBm may be G2. Although the third association information 711 to 720 is used, the gains 1102 and 1112 corresponding to both the frequency bands may differ.

According to various embodiments, as the gains 1102 and 1112 corresponding to both the frequency bands identified based on the third association information 711 to 720 differ, the electronic device 101 may operate at least one attenuator. The at least one attenuator may be connected, e.g., between the external low-noise amplifier and the RFIC, but the position where it is connected is not limited, and this is described with reference to FIG. 12.

Figure 11B:
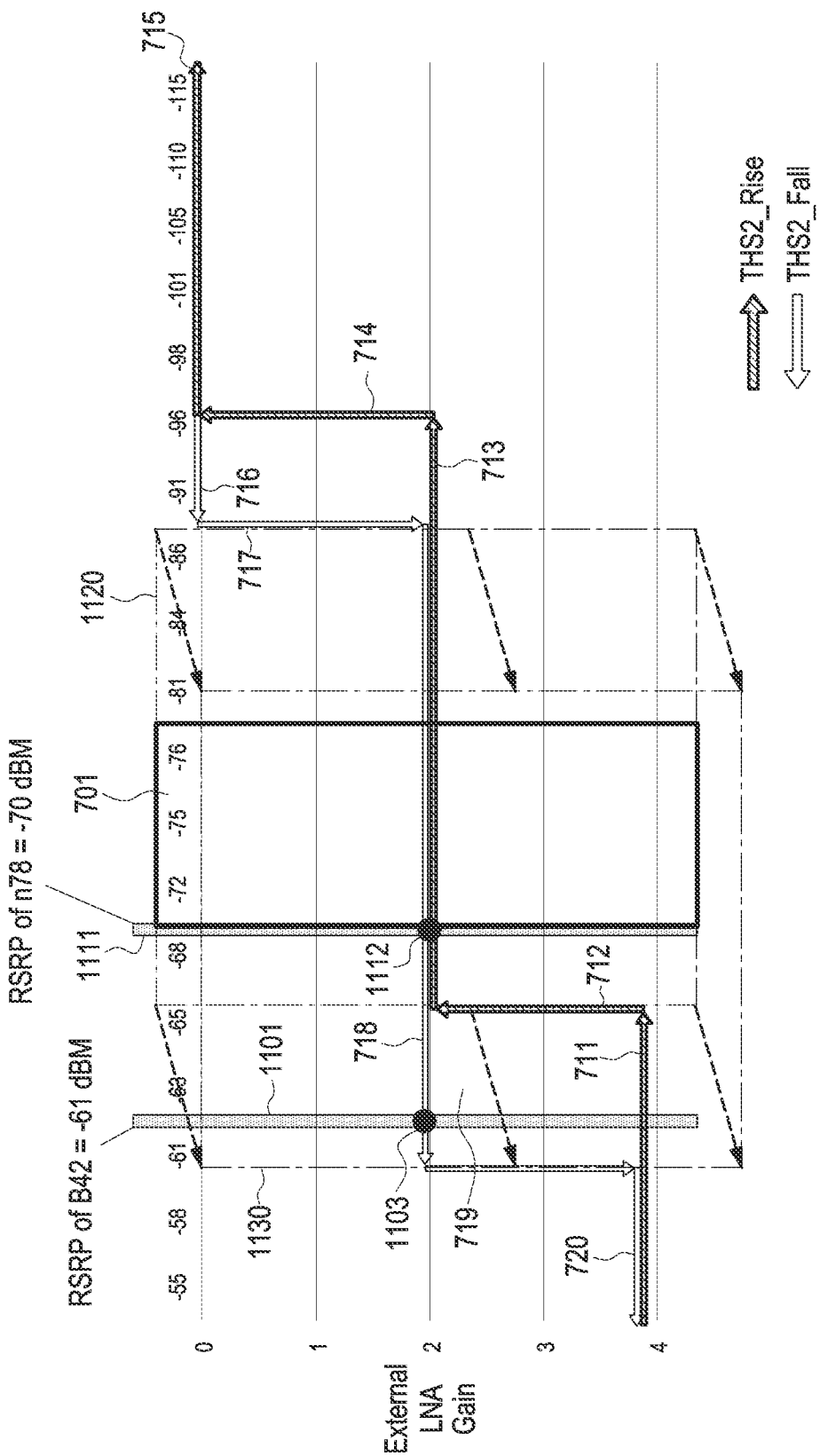

Referring to FIG. 11B, the electronic device 101 may operate the attenuator disposed in the RF path for processing the B42 band and the N78 band. The degree of attenuation of the attenuator may be, e.g., 9 dB. When attenuated by 9 dB, the region 1120 corresponding to the gain of G2 set according to the third association information may be shifted by 9 dB in the direction in which the reception strength increases (e.g., to the left in FIG. 11B). If the first reception strength 1101 and the second reception strength 1111 are included in the shifted region 1130, the gains 1103 and 1112 corresponding to the first reception strength 1101 and the second reception strength 1111 may be determined to be identical as G2. The association information resultant from shifting the third association information may be an example of the fourth association information. The electronic device 101 may determine the gain corresponding to the B42 band and N78 band as G2 based on the fourth association information and operate the attenuator. The electronic device 101 may adjust the bias of the external low-noise amplifier and/or gain of the RFIC to compensate for the degree of attenuation of the attenuator. Accordingly, the entire gain may be maintained, or a gain close to the existing entire gain may be obtained. The electronic device 101 may determine the degree of attenuation to use the region corresponding to G2, based on any one of both the reception strengths being included in the region corresponding to G2 while the other is included in the region corresponding to G4. For example, the electronic device 101 may determine the degree of attenuation so that the other reception strength included in the region corresponding to G4 is included in the region corresponding to G2, but the method for determining the degree of attenuation is not limited.

According to various embodiments, the electronic device 101 may set the gain of the external low-noise amplifier using the region corresponding to the gain of G0 of the shifted fourth association information.

Figure 11C:
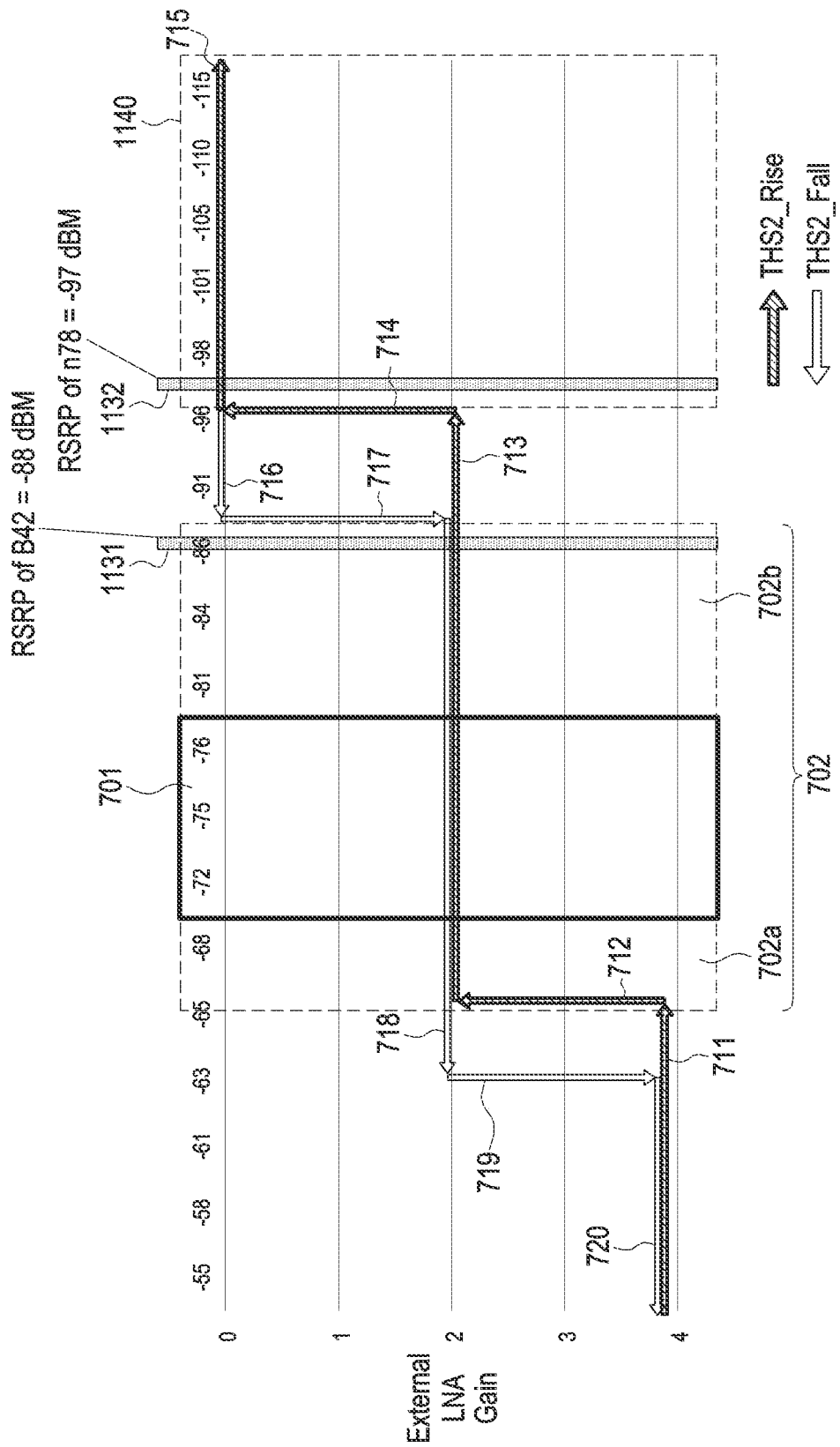

FIG. 11C illustrates the region 1140 corresponding to G0 in the third association information. For example, it is assumed that the first reception strength 1131 of the RF signal of the B42 band is −88 dBm, and the second reception strength 1132 of the RF signal of the N78 band is −97 dBm. The second reception strength 1132 of −97 dBm may be included in the region 1140 corresponding to G0 in the third association information, but the first reception strength 1131 of −88 dBm may not be included. If the electronic device 101 references the third association information, the gains corresponding to the first reception strength 1131 and the second reception strength 1132 may differ as G2 and G0. The electronic device 101 may operate the attenuator. The third association information may be shifted according to the degree of attenuation of the attenuator.

Figure 11D:
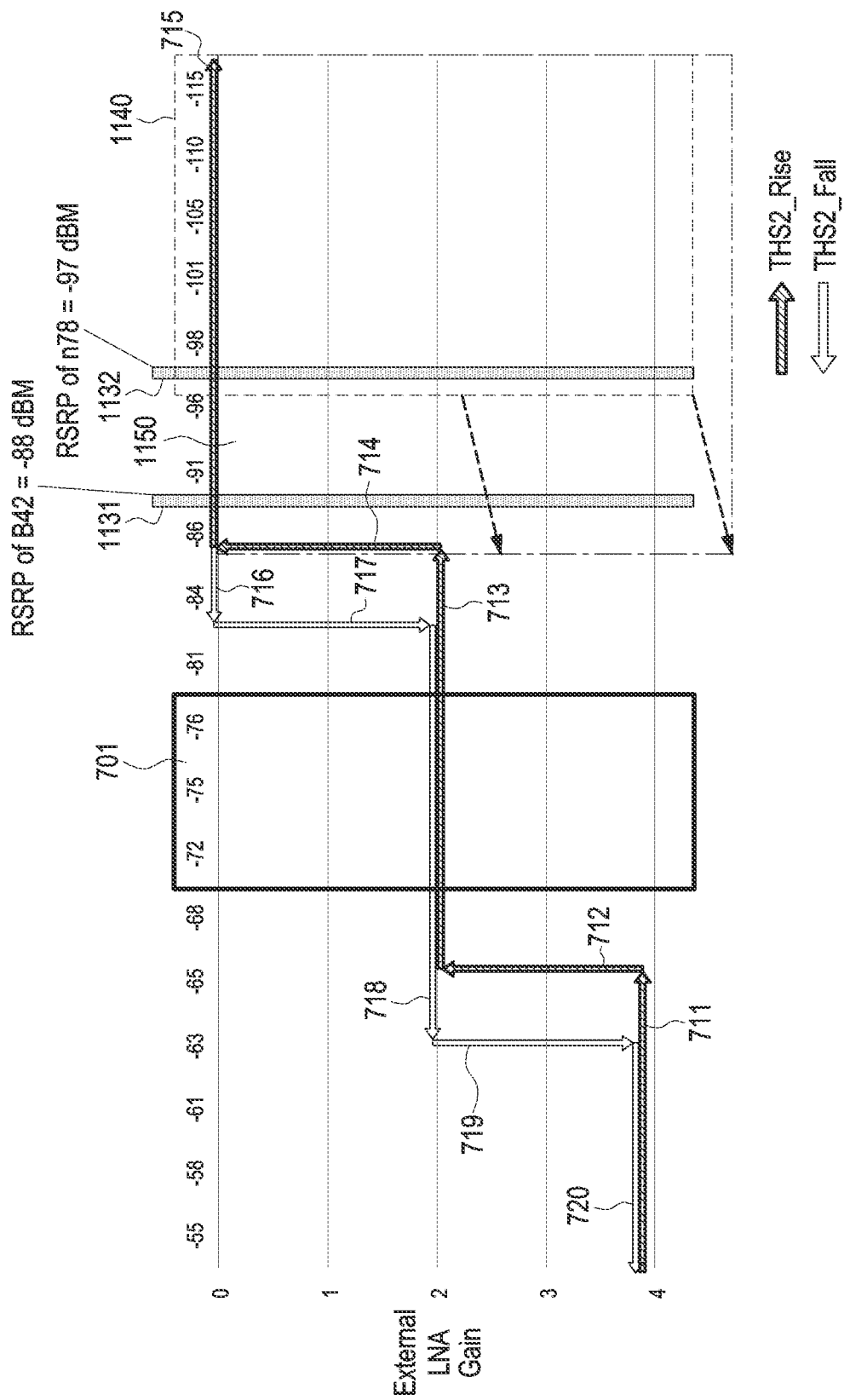

For example, FIG. 11D illustrates a shifted region 1150 corresponding to G0, as part of the fourth association information which is resultant from shifting the third association information. In the shifted region 1150, both the first reception strength 1131 and the second reception strength 1132 may be included. Meanwhile, since the region corresponding to G0 has no lower limit, shift herein may be referred to as extend. The electronic device 101 may set G0 as the gains corresponding to the first reception strength 1131 and the second reception strength 1132 based on the shifted fourth association information. The electronic device 101 may operate the attenuator by the degree of attenuation corresponding to the shifted degree of the fourth association information. The electronic device 101 may adjust the bias of the external low-noise amplifier and/or gain of the RFIC to compensate for the degree of attenuation of the attenuator. The electronic device 101 may control to allow the entire noise figure (NF) to have a value identical or similar to the existing value. The electronic device 101 may determine the degree of attenuation to use the region corresponding to G2, based on any one of both the reception strengths being included in the region corresponding to G0 while the other is included in the region corresponding to G0. For example, the electronic device 101 may determine the degree of attenuation so that the other reception strength included in the region corresponding to G2 is included in the region corresponding to G0, but the method for determining the degree of attenuation is not limited.

Meanwhile, shifting the third association information is merely an example and, according to various embodiments, the electronic device 101 may shift the first association information and/or the second association information and determine the gain of the low-noise amplifier based on the shifted result.

Figure 12:
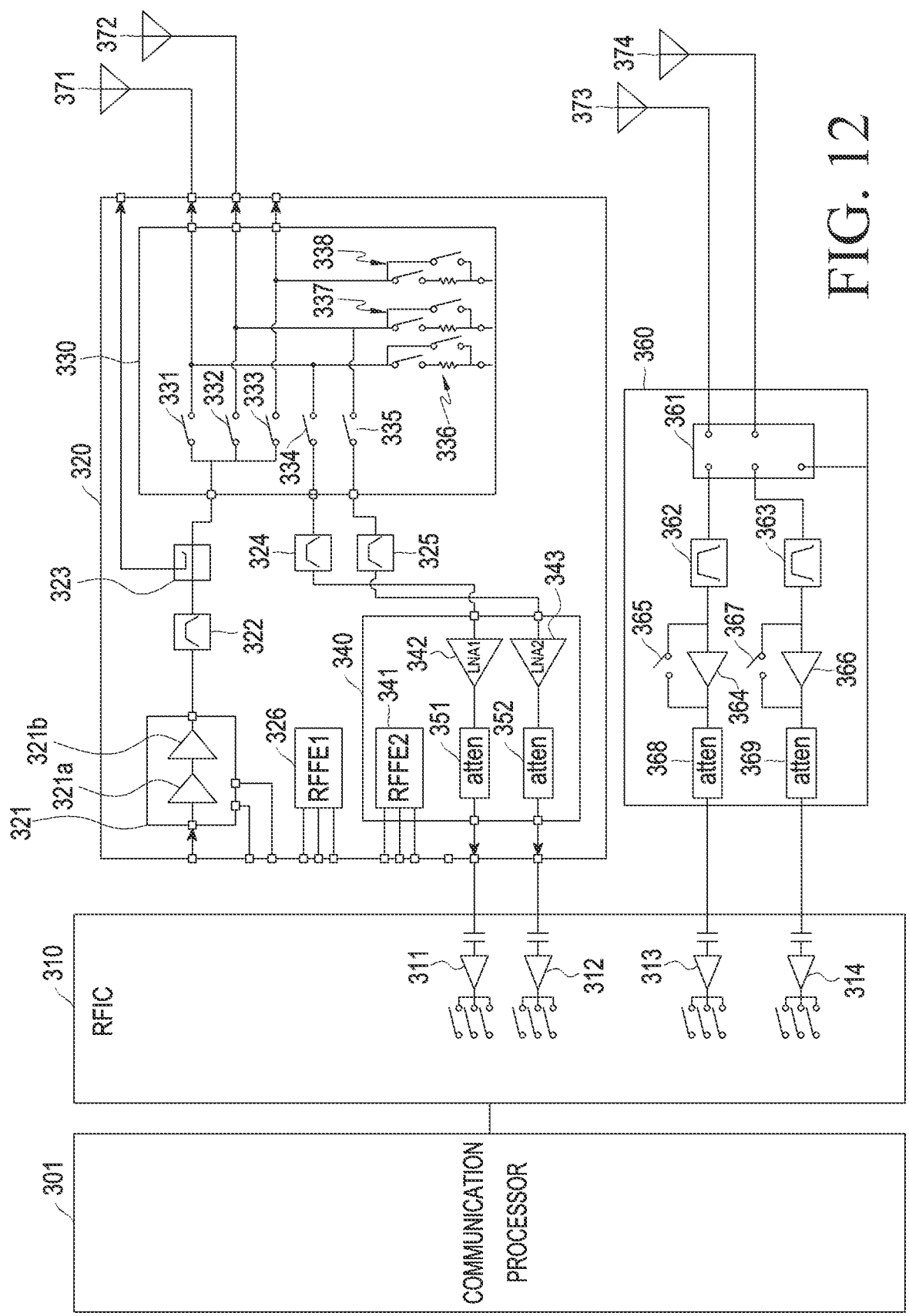
FIG. 12 is a block diagram illustrating an electronic device according to various embodiments.

FIG. 12 is a block diagram illustrating an electronic device according to various embodiments.

As compared with FIG. 3, in the embodiment of FIG. 12, the electronic device 101 may further include at least one attenuator 351, 352, 368, and 369. Each of the at least one attenuator 351, 352, 368, and 369 may be connected between the amplifier 342, 343, 364, and 366 and the RFIC 310. However, it will be understood by one of ordinary skill in the art that the position of the at least one attenuator 351, 352, 368, and 369 is merely exemplary, and the position of the at least one attenuator 351, 352, 368, and 369 is not limited as long as it is an RF path. The communication processor 301 may provide a control signal of the at least one attenuator 351, 352, 368, and 369 through MIPI. The communication processor 301 may identify a shifting degree for the third association information, such that reception strengths corresponding to a plurality of frequency bands have the same gain. The communication processor 301 may determine the degree of attenuation as the identified shifting degree. The communication processor 301 may provide a control signal including the determined degree of attenuation to the at least one attenuator 351, 352, 368, and 369 through MIPI.

Figure 13:
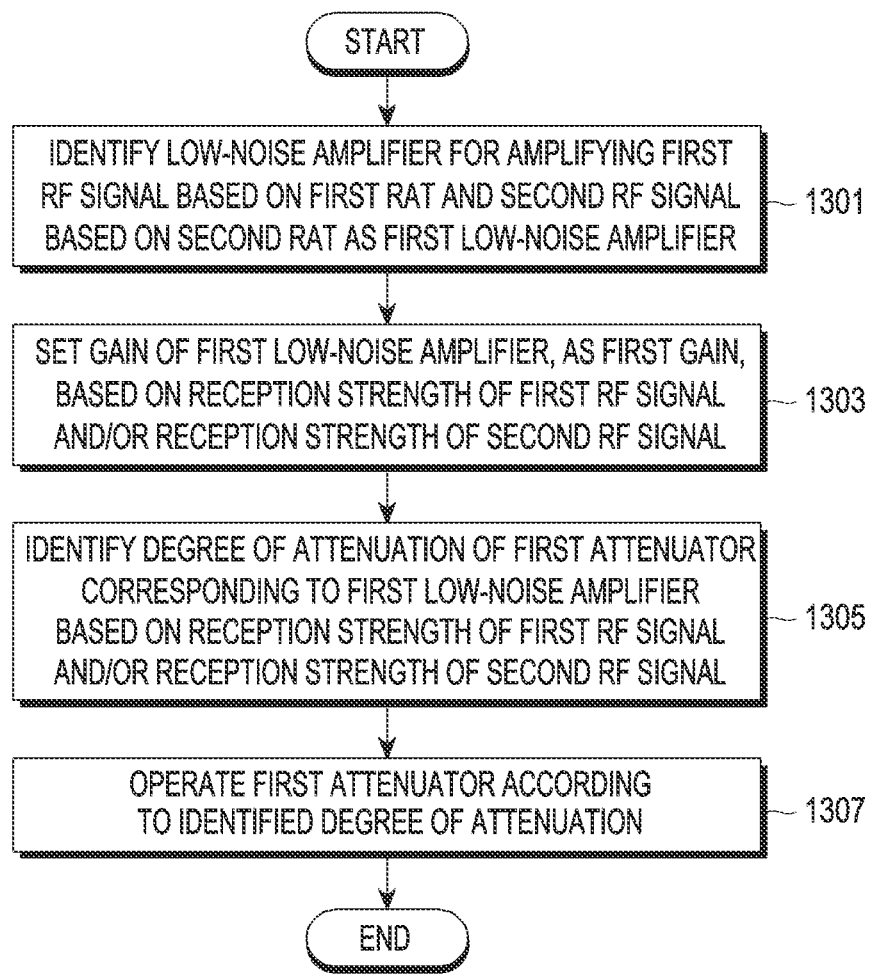
FIG. 13 is a flowchart illustrating an operation method of an electronic device according to various embodiments.

FIG. 13 is a flowchart illustrating an operation method of an electronic device according to various embodiments.

Referring to FIG. 13, according to an embodiment, an electronic device 101 (e.g., at least one of the processor 120, the first communication processor 212, the second communication processor 214, the integrated communication processor 260, or the communication processor 301) may identify that a low-noise amplifier for amplifying a first RF signal based on a first RAT and a second RF signal based on a second RAT is a first low-noise amplifier in operation 1301. In operation 1303, the electronic device 101 may set the gain of the first low-noise amplifier as a first gain based on the reception strength of the first RF signal and/or the reception strength of the second RF signal. In operation 1305, the electronic device 101 may identify the degree of attenuation of a first attenuator corresponding to the first low-noise amplifier based on the reception strength of the first RF signal and/or the reception strength of the second RF signal. As described above, the electronic device 101 may identify that the gains corresponding to both the reception strengths differ in the association information (e.g., third association information). The electronic device 101 may identify the shifting degree at which the gains corresponding to both the reception strengths become identical, as the degree of attenuation. For example, if the gains corresponding to both the reception strengths are identified as G2 and G4, the electronic device 101 may identify that the shifting degree to allow both the reception strengths to correspond to G2, as the degree of attenuation. For example, if the gains corresponding to both the reception strengths are identified as G0 and G2, the electronic device 101 may identify the shifting degree to allow both the reception strengths to correspond to G0, as the degree of attenuation. In operation 1307, the electronic device 101 may operate the first attenuator based on the identified degree of attenuation.

According to various embodiments, the electronic device 101 may perform an operation for compensating for the entire gain and/or the entire NF. If set as a gain value lower than the gain value determined by the first association information or second association information, the electronic device 101 may allow the entire gain to be maintained (or have a close value) by increasing the gain value of the RFIC (e.g., the gain value of the internal low-noise amplifier and/or the ABB gain value). If set as a gain value higher than the gain value determined by the first association information or the second association information, the electronic device 101 may allow the entire gain to be maintained (or have a close value) by reducing the gain value of the RFIC.

For example, the electronic device 101 may use the association information as shown in Table 17. For example, Table 17 may be a result of shifting by 5 dB on the gain mode of the external low-noise amplifier in Table 16.

TABLE 17

| Cell power (dBm) | RSRP (dBm) | AGC log (RFIC) | internal gain value (dB) | external LNA gain mode | external gain value (dB) | external LNA bias mode | entire gain (dB) |
|---|---|---|---|---|---|---|---|
| −20 | −55 | 8 | 12 | G4 | −4.2 | 3 | 7.8 |
| −23 | −58 | | | | | | 12.8 |
| −25 | −61 | | | | | | |
| −27 | −63 | | | G2 | 11.9 | | |
| −30 | −65 | 7 | 17 | | | | 15.8 |
| −32 | −68 | | | | | | 34.9 |
| −35 | −72 | 6 | 20 | | | | 37.9 |
| −38 | −75 | 1 | 35 | | | | 37.9 |
| −40 | −76 | 0 | 43 | | | | 40.9 |
| −45 | −81 | | | | | | 43.9 |
| −48 | −84 | | | | | | |
| −50 | −86 | | | | | | 46.9 |
| −55 | −91 | | | G0 | 19 | | |
| −60 | −96 | | | | | | 54 |
| −62 | −98 | | | | | | |
| −65 | −101 | | | | | | 62 |
| −70 | −105 | | | | | | |
| −75 | −110 | | | | | | |
| −85 | −115 | | | | | | |
| −90 | −120 | | | | | | |

Meanwhile, the bias being constant as 3 in Table 17 is merely an example and, as described in connection with FIG. 11D, a different bias (e.g., 7) may be set in a partial region (e.g., the region corresponding to G0). This may be a value for compensating for the entire gain and/or the entire NF.

As described based on Equation 1, the entire NF may be set based on the NF and gain for each amplifier. Upon performing shifting, the electronic device 101 may pre-store and/or calculate parameters (e.g., at least one of the gain and/or NF of the internal low-noise amplifier and/or the ABB amplifier or the bias of the external low-noise amplifier) for compensating for the entire gain and/or the entire NF (e.g., to allow it to have the same value (or similar value) as the entire gain and/or the entire NF set for a single frequency band). According to the fourth association information resultant from shifting the third association information, the electronic device 101 may set at least some of the gain of the internal low-noise amplifier, the gain of the ABB amplifier, and/or the bias of the external low-noise amplifier to compensate for the entire gain and/or the entire NF. For example, the electronic device 101 may pre-store or generate, based on calculation, the fourth association information including the parameters for which the entire gain and/or the entire NF is considered, corresponding to the degree of attenuation of the attenuator.

Meanwhile, if the gains corresponding to both the reception strengths may not be rendered identical even by shifting, the electronic device 101 may perform an operation (e.g., radio link failure (RLF) declaration) for releasing any one RAT (e.g., the RAT corresponding to SCG).

According to various embodiments, an electronic device (e.g., the electronic device 101) supporting a first RAT and a second RAT may comprise at least one antenna (e.g., at least one of the second antenna module 242, the second antenna module 244, the third antenna module 246, or the antennas 371, 372, 373, and 374), at least one low-noise amplifier (e.g., at least one of the first RFFE 232, the second RFFE 234, the third RFFE 236, or the low-noise amplifiers 342, 343, 364, and 366) configured to amplify at least one RF signal output from the at least one antenna, at least one RFIC (e.g., at least one of the first RFIC 222, the second RFIC 224, the third RFIC 226, the fourth RFIC 228, or the RFIC 310) configured to process at least one amplified RF signal output from the low-noise amplifier, and at least one communication processor (e.g., at least one of the first communication processor 212, the second communication processor 214, the integrated communication processor 260, or the communication processor 301) receiving at least one processed signal output from the at least one RFIC. The at least one communication processor may be configured to identify a low-noise amplifier for amplifying a first RF signal based on a first frequency band of the first RAT output from at least some of the at least one antenna and a low-noise amplifier for amplifying a second RF signal based on a second frequency band of the second RAT output from at least some of the at least one antenna, from among the at least one low-noise amplifier, based on the low-noise amplifier for amplifying the first RF signal differing from the low-noise amplifier for amplifying the second RF signal, set a first gain of the low-noise amplifier for amplifying the first RF signal corresponding to a first reception strength of the first RF signal, by referring to first association information corresponding to the first frequency band, set a second gain of the low-noise amplifier for amplifying the second RF signal corresponding to a second reception strength of the second RF signal, by referring to second association information corresponding to the second frequency band, based on the low-noise amplifier for amplifying the first RF signal being identical to the low-noise amplifier for amplifying the second RF signal, set a third gain of a low-noise amplifier of amplifying the first RF signal and the second RF signal corresponding to the first reception strength and/or the second reception strength, by referring to third association information at least partially different from the first association information and/or the second association information.

According to various embodiments, at least one switching point where gains in the third association information are switched may at least partially differ from at least one switching point where gains in the first association information are switched and/or at least one switching point where gains in the second association information are switched.

According to various embodiments, a region in a reception strength corresponding to at least one gain in the third association information may at least partially differ from a region in a reception strength corresponding to the at least one gain in the first association information and/or a region in a reception strength corresponding to the at least one gain in the second association information.

According to various embodiments, a size of the region of the reception strength corresponding to the at least one gain in the third association information may be larger than a size of the region of the reception strength corresponding to the at least one gain in the first association information and/or a size of the region of the reception strength corresponding to the at least one gain in the second association information.

According to various embodiments, a number of at least one gain settable in the third association information may be smaller than a number of at least one gain settable in the first association information and/or a number of at least one gain settable in the second association information.

According to various embodiments, the at least one communication processor may be further configured to, based on setting the third gain of the low-noise amplifier for amplifying the first RF signal and the second RF signal, set a gain of the RFIC and/or a bias of the low-noise amplifier for amplifying the first RF signal and the second RF signal to allow an entire gain based on the third gain to have a difference of a specific value or less from an entire gain based on the third gain and/or the second gain and/or to allow an entire noise figure based on the third gain to have a difference of a specific value or less from an entire noise figure based on the first gain and/or the second gain.

According to various embodiments, the at least one communication processor may be configured to, as at least part of setting the third gain of the low-noise amplifier of amplifying the first RF signal and the second RF signal corresponding to the first reception strength and/or the second reception strength, by referring to the third association information, set the third gain of the low-noise amplifier of amplifying the first RF signal and the second RF signal corresponding to the first reception strength and/or the second reception strength, by referring to the third association information, based on a gain corresponding to the first reception strength identified by referring to the third association information being identical to a gain corresponding to the second reception strength identified by referring to the third association information.

According to various embodiments, the electronic device may further comprise at least one attenuator (e.g., the attenuators 351, 352, 368, and 369) connecting between the at least one RFIC and the at least one low-noise amplifier. The at least one communication processor may be further configured to, based on the gain corresponding to the first reception strength identified by referring to the third association information differing from the gain corresponding to the second reception strength identified by referring to the third association information, operate an attenuator connected to the low-noise amplifier for amplifying the first RF signal and the second RF signal among the at least one attenuator, and set a fourth gain of the low-noise amplifier for amplifying the first RF signal and the second RF signal corresponding to the first reception strength and/or the second reception strength, by referring to fourth association information resultant from shifting the third association information based on a degree of attenuation of the attenuator.

According to various embodiments, the degree of attenuation may be determined to allow a gain corresponding to the first reception strength identified by referring to the fourth association information have the same value as a gain corresponding to the second reception strength identified by referring to the fourth association information.

According to various embodiments, the at least one communication processor may be further configured to, based on setting the fourth gain of the low-noise amplifier for amplifying the first RF signal and the second RF signal, set a gain of the RFIC and/or a bias of the low-noise amplifier for amplifying the first RF signal and the second RF signal to allow an entire gain based on the fourth gain to have a difference of a specific value or less from an entire gain based on the fourth gain and/or the second gain and/or to allow an entire noise figure based on the third gain to have a difference of a specific value or less from an entire noise figure based on the first gain and/or the second gain.

According to various embodiments, a method for operating an electronic device supporting a first RAT and a second RAT may comprise identifying a low-noise amplifier for amplifying a first RF signal based on a first frequency band of the first RAT and a low-noise amplifier for amplifying a second RF signal based on a second frequency band of the second RAT, from among at least one low-noise amplifier of the electronic device, based on the low-noise amplifier for amplifying the first RF signal differing from the low-noise amplifier for amplifying the second RF signal, setting a first gain of the low-noise amplifier for amplifying the first RF signal corresponding to a first reception strength of the first RF signal, by referring to first association information corresponding to the first frequency band, and setting a second gain of the low-noise amplifier for amplifying the second RF signal corresponding to a second reception strength of the second RF signal, by referring to second association information corresponding to the second frequency band, based on the low-noise amplifier for amplifying the first RF signal being identical to the low-noise amplifier for amplifying the second RF signal, setting a third gain of a low-noise amplifier of amplifying the first RF signal and the second RF signal corresponding to the first reception strength and/or the second reception strength, by referring to third association information at least partially different from the first association information and/or the second association information.

According to various embodiments, at least one switching point where gains in the third association information are switched may at least partially differ from at least one switching point where gains in the first association information are switched and/or at least one switching point where gains in the second association information are switched.

According to various embodiments, a region in a reception strength corresponding to at least one gain in the third association information may at least partially differ from a region in a reception strength corresponding to the at least one gain in the first association information and/or a region in a reception strength corresponding to the at least one gain in the second association information.

According to various embodiments, a size of the region of the reception strength corresponding to the at least one gain in the third association information may be larger than a size of the region of the reception strength corresponding to the at least one gain in the first association information and/or a size of the region of the reception strength corresponding to the at least one gain in the second association information.

According to various embodiments, a number of at least one gain settable in the third association information may be smaller than a number of at least one gain settable in the first association information and/or a number of at least one gain settable in the second association information.

According to various embodiments, setting the third gain of the low-noise amplifier for amplifying the first RF signal and the second RF signal corresponding to the first reception strength and/or the second reception strength, by referring to the third association information may set the third gain of the low-noise amplifier of amplifying the first RF signal and the second RF signal corresponding to the first reception strength and/or the second reception strength, by referring to the third association information, based on a gain corresponding to the first reception strength identified by referring to the third association information being identical to a gain corresponding to the second reception strength identified by referring to the third association information.

According to various embodiments, the method for operating the electronic device may further comprise, based on the gain corresponding to the first reception strength identified by referring to the third association information differing from the gain corresponding to the second reception strength identified by referring to the third association information, operating an attenuator connected to the low-noise amplifier for amplifying the first RF signal and the second RF signal, and setting a fourth gain of the low-noise amplifier for amplifying the first RF signal and the second RF signal corresponding to the first reception strength and/or the second reception strength, by referring to fourth association information resultant from shifting the third association information based on a degree of attenuation of the attenuator.

According to various embodiments, the degree of attenuation may be determined to allow a gain corresponding to the first reception strength identified by referring to the fourth association information have the same value as a gain corresponding to the second reception strength identified by referring to the fourth association information.

According to various embodiments, the method for operating the electronic device may further comprise, based on setting the fourth gain of the low-noise amplifier for amplifying the first RF signal and the second RF signal, setting a gain of the RFIC of the electronic device and/or a bias of the low-noise amplifier for amplifying the first RF signal and the second RF signal to allow an entire gain based on the fourth gain to have a difference of a specific value or less from an entire gain based on the third gain and/or the second gain and/or to allow an entire noise figure based on the fourth gain to have a difference of a specific value or less from an entire noise figure based on the first gain and/or the second gain.

According to various embodiments, an electronic device supporting a first RAT and a second RAT may comprise at least one antenna, at least one low-noise amplifier configured to amplify at least one RF signal output from the at least one antenna, at least one RFIC configured to process at least one amplified RF signal output from the low-noise amplifier, at least one attenuator connected between the at least one RFIC and the at least one low-noise amplifier, and at least one communication processor receiving at least one processed signal output from the at least one RFIC. The at least one communication processor may be configured to identify a first low-noise amplifier among the at least one low-noise amplifier, as a low-noise amplifier for amplifying a first RF signal based on the first RAT and a second RF signal based on the second RAT output from at least some of the at least one antenna, set a setting value of the first low-noise amplifier as a first setting value to amplify the first RF signal and the second RF signal, and identify whether at least one first attenuator connected to the first low-noise amplifier among the at least one attenuator is operated, based on a first reception strength of the first RF signal and a second reception strength of the second RF signal.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device supporting a first radio access technology (RAT) and a second RAT, comprising:
   at least one antenna;
   at least one low-noise amplifier configured to amplify at least one radio frequency (RF) signal output from the at least one antenna;
   at least one radio frequency integrated circuit (RFIC) configured to process at least one amplified RF signal output from the low-noise amplifier, and
   at least one communication processor receiving at least one processed signal output from the at least one RFIC,
   wherein the at least one communication processor is configured to:
     identify a low-noise amplifier for amplifying a first RF signal based on a first frequency band of the first RAT output from at least some of the at least one antenna and a low-noise amplifier for amplifying a second RF signal based on a second frequency band of the second RAT output from at least some of the at least one antenna, from among the at least one low-noise amplifier,
     based on the low-noise amplifier for amplifying the first RF signal differing from the low-noise amplifier for amplifying the second RF signal:
       set a first gain of the low-noise amplifier for amplifying the first RF signal corresponding to a first reception strength of the first RF signal, by referring to first association information corresponding to the first frequency band, and
       set a second gain of the low-noise amplifier for amplifying the second RF signal corresponding to a second reception strength of the second RF signal, by referring to second association information corresponding to the second frequency band, and
     based on the low-noise amplifier for amplifying the first RF signal being identical to the low-noise amplifier for amplifying the second RF signal:
       set a third gain of a low-noise amplifier of amplifying the first RF signal and the second RF signal corresponding to the first reception strength and/or the second reception strength, by referring to third association information at least partially different from the first association information and/or the second association information.

2. The electronic device of claim 1, wherein at least one switching point where gains in the third association information are switched at least partially differs from at least one switching point where gains in the first association information are switched and/or at least one switching point where gains in the second association information are switched.

3. The electronic device of claim 1, wherein a region in a reception strength corresponding to at least one gain in the third association information at least partially differs from a region in a reception strength corresponding to the at least one gain in the first association information and/or a region in a reception strength corresponding to the at least one gain in the second association information.

4. The electronic device of claim 3, wherein a size of the region of the reception strength corresponding to the at least one gain in the third association information is larger than a size of the region of the reception strength corresponding to the at least one gain in the first association information and/or a size of the region of the reception strength corresponding to the at least one gain in the second association information.

5. The electronic device of claim 1, wherein a number of at least one gain settable in the third association information is smaller than a number of at least one gain settable in the first association information and/or a number of at least one gain settable in the second association information.

6. The electronic device of claim 1, wherein the at least one communication processor is configured to, based on setting the third gain of the low-noise amplifier for amplifying the first RF signal and the second RF signal:
set a gain of the RFIC and/or a bias of the low-noise amplifier for amplifying the first RF signal and the second RF signal to allow an entire gain based on the third gain to have a difference of a specific value or less from an entire gain based on the third gain and/or the second gain and/or to allow an entire noise figure based on the third gain to have a difference of a specific value or less from an entire noise figure based on the first gain and/or the second gain.

7. The electronic device of claim 1, wherein the at least one communication processor is configured to, as at least part of setting the third gain of the low-noise amplifier of amplifying the first RF signal and the second RF signal corresponding to the first reception strength and/or the second reception strength, by referring to the third association information,
set the third gain of the low-noise amplifier of amplifying the first RF signal and the second RF signal corresponding to the first reception strength and/or the second reception strength, by referring to the third association information, based on a gain corresponding to the first reception strength identified by referring to the third association information being identical to a gain corresponding to the second reception strength identified by referring to the third association information.

8. The electronic device of claim 7, further comprising:
at least one attenuator connecting between the at least one RFIC and the at least one low-noise amplifier,
wherein the at least one communication processor is further configured to, based on the gain corresponding to the first reception strength identified by referring to the third association information differing from the gain corresponding to the second reception strength identified by referring to the third association information:
operate an attenuator connected to the low-noise amplifier for amplifying the first RF signal and the second RF signal among the at least one attenuator, and
set a fourth gain of the low-noise amplifier for amplifying the first RF signal and the second RF signal corresponding to the first reception strength and/or the second reception strength, by referring to fourth association information resultant from shifting the third association information based on a degree of attenuation of the attenuator.

9. The electronic device of claim 8, wherein the degree of attenuation is determined to allow a gain corresponding to the first reception strength identified by referring to the fourth association information have the same value as a gain corresponding to the second reception strength identified by referring to the fourth association information.

10. The electronic device of claim 8, wherein the at least one communication processor is further configured to, based on setting the fourth gain of the low-noise amplifier for amplifying the first RF signal and the second RF signal:
set a gain of the RFIC and/or a bias of the low-noise amplifier for amplifying the first RF signal and the second RF signal to allow an entire gain based on the fourth gain to have a difference of a specific value or less from an entire gain based on the third gain and/or the second gain and/or to allow an entire noise figure based on the fourth gain to have a difference of a specific value or less from an entire noise figure based on the first gain and/or the second gain.

11. A method for operating an electronic device supporting a first radio access technology (RAT) and a second RAT, the method comprising:
identifying a low-noise amplifier for amplifying a first RF signal based on a first frequency band of the first RAT and a low-noise amplifier for amplifying a second radio frequency (RF) signal based on a second frequency band of the second RAT, from among at least one low-noise amplifier of the electronic device;
based on the low-noise amplifier for amplifying the first RF signal differing from the low-noise amplifier for amplifying the second RF signal:
setting a first gain of the low-noise amplifier for amplifying the first RF signal corresponding to a first reception strength of the first RF signal, by referring to first association information corresponding to the first frequency band, and
setting a second gain of the low-noise amplifier for amplifying the second RF signal corresponding to a second reception strength of the second RF signal, by referring to second association information corresponding to the second frequency band, and
based on the low-noise amplifier for amplifying the first RF signal being identical to the low-noise amplifier for amplifying the second RF signal:
setting a third gain of a low-noise amplifier of amplifying the first RF signal and the second RF signal corresponding to the first reception strength and/or the second reception strength, by referring to third association information at least partially different from the first association information and/or the second association information.

12. The method of claim 11, wherein at least one switching point where gains in the third association information are switched at least partially differs from at least one switching point where gains in the first association information are switched and/or at least one switching point where gains in the second association information are switched.

13. The method of claim 11, wherein a region in a reception strength corresponding to at least one gain in the third association information at least partially differs from a region in a reception strength corresponding to the at least one gain in the first association information and/or a region in a reception strength corresponding to the at least one gain in the second association information.

14. The method of claim 13, wherein a size of the region of the reception strength corresponding to the at least one gain in the third association information is larger than a size of the region of the reception strength corresponding to the at least one gain in the first association information and/or a size of the region of the reception strength corresponding to the at least one gain in the second association information.

15. The method of claim 11, wherein a number of at least one gain settable in the third association information is smaller than a number of at least one gain settable in the first association information and/or a number of at least one gain settable in the second association information.

16. The method of claim 11, wherein setting the third gain of the low-noise amplifier for amplifying the first RF signal and the second RF signal corresponding to the first reception strength and/or the second reception strength, by referring to the third association information includes:
    setting the third gain of the low-noise amplifier of amplifying the first RF signal and the second RF signal corresponding to the first reception strength and/or the second reception strength, by referring to the third association information, based on a gain corresponding to the first reception strength identified by referring to the third association information being identical to a gain corresponding to the second reception strength identified by referring to the third association information.

17. The method of claim 16, further comprising:
based on the gain corresponding to the first reception strength identified by referring to the third association information differing from the gain corresponding to the second reception strength identified by referring to the third association information:
    operating an attenuator connected to the low-noise amplifier for amplifying the first RF signal and the second RF signal, and
    setting a fourth gain of the low-noise amplifier for amplifying the first RF signal and the second RF signal corresponding to the first reception strength and/or the second reception strength, by referring to fourth association information resultant from shifting the third association information based on a degree of attenuation of the attenuator.

18. The method of claim 17, wherein the degree of attenuation is determined to allow a gain corresponding to the first reception strength identified by referring to the fourth association information have the same value as a gain corresponding to the second reception strength identified by referring to the fourth association information.

19. The method of claim 17, further comprising:
based on setting the fourth gain of the low-noise amplifier for amplifying the first RF signal and the second RF signal:
    setting a gain of a radio frequency integrated circuit (RFIC) of the electronic device and/or a bias of the low-noise amplifier for amplifying the first RF signal and the second RF signal to allow an entire gain based on the fourth gain to have a difference of a specific value or less from an entire gain based on the third gain and/or the second gain and/or to allow an entire noise figure based on the fourth gain to have a difference of a specific value or less from an entire noise figure based on the first gain and/or the second gain.

20. An electronic device supporting a first radio access technology (RAT) and a second RAT, the electronic device comprising:
    at least one antenna;
    at least one low-noise amplifier configured to amplify at least one radio frequency (RF) signal output from the at least one antenna;
    at least one radio frequency integrated circuit (RFIC) configured to process at least one amplified RF signal output from the low-noise amplifier;
    at least one attenuator connected between the at least one RFIC and the at least one low-noise amplifier, and
    at least one communication processor receiving at least one processed signal output from the at least one RFIC,
    wherein the at least one communication processor is configured to:
        identify a first low-noise amplifier among the at least one low-noise amplifier, as a low-noise amplifier for amplifying a first RF signal based on the first RAT and a second RF signal based on the second RAT output from at least some of the at least one antenna,
        set a setting value of the first low-noise amplifier as a first setting value to amplify the first RF signal and the second RF signal, and
        identify whether at least one first attenuator connected to the first low-noise amplifier among the at least one attenuator is operated, based on a first reception strength of the first RF signal and a second reception strength of the second RF signal.

* * * * *